(12) United States Patent
Babej

(10) Patent No.: US 7,131,807 B1
(45) Date of Patent: Nov. 7, 2006

(54) FUNCTIONAL ELEMENT, METHOD FOR FIXING IT IN A SHEET METAL PART, ASSEMBLING ELEMENT AND SWAGING ASSEMBLY

(75) Inventor: Jiri Babej, Lich (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 27 days.

(21) Appl. No.: 10/030,410

(22) PCT Filed: Jul. 7, 2000

(86) PCT No.: PCT/EP00/06465

§ 371 (c)(1),
(2), (4) Date: Jun. 20, 2002

(87) PCT Pub. No.: WO01/03880

PCT Pub. Date: Jan. 18, 2001

(30) Foreign Application Priority Data

| Jul. 9, 1999 | (DE) | 199 32 023 |
| Jul. 30, 1999 | (DE) | 199 35 923 |
| Apr. 16, 2000 | (DE) | 100 18 716 |

(51) Int. Cl.
*F16B 37/04* (2006.01)
(52) U.S. Cl. .............. 411/181; 411/179; 411/107; 411/501; 411/503; 29/432.2; 29/524.1; 29/512
(58) Field of Classification Search .......... 411/181, 411/180, 179, 183, 107, 501–503; 29/432.2, 29/432, 432.1, 524.1, 525.06, 512
See application file for complete search history.

(56) References Cited

U.S. PATENT DOCUMENTS

| 2,071,507 A | * | 2/1937 | Dews | 29/432.1 |
| 3,686,914 A | | 8/1972 | Powsey | |
| 4,039,099 A | * | 8/1977 | Boxall | 220/773 |
| 4,204,308 A | * | 5/1980 | Marling | 29/426.5 |
| 4,633,560 A | * | 1/1987 | Muller | 29/798 |
| 4,826,372 A | * | 5/1989 | Kendall | 411/43 |
| 5,815,906 A | * | 10/1998 | Johnsen | 29/524.1 |
| 6,042,313 A | * | 3/2000 | Dehlke | 411/43 |
| 6,213,699 B1 | * | 4/2001 | Sadri et al. | 411/43 |
| 6,257,814 B1 | * | 7/2001 | Muller | 411/176 |
| 6,325,584 B1 | * | 12/2001 | Marko et al. | 411/501 |
| 6,332,261 B1 | * | 12/2001 | MacFarland | 29/510 |
| 6,338,601 B1 | * | 1/2002 | Mauer et al. | 411/503 |

(Continued)

FOREIGN PATENT DOCUMENTS

DE 3447006 A1 * 7/1986

(Continued)

*Primary Examiner*—Katherine Mitchell
(74) *Attorney, Agent, or Firm*—Hunton & Williams LLP; Eugene C. Rzucidlo

(57) ABSTRACT

The invention concerns a functional element, in particular a bolt, consisting of a shank portion (14) and a head portion (16) designed to be assembled riveted with a plate element, in particular a sheet metal part. The invention is characterised in that the head portion (16) is hollow and has practically the same external diameter as the shank portion. When mounted, the hollow head portion (16) of the functional element (10) forms a riveting edge (37) on one side of the sheet metal part and an annular groove (52) on the other side of the sheet metal part, the annular groove (52) acting as a flange. The invention further concerns a method for fixing the functional element in a sheet metal part and the resulting assembling element (16), as well as a matrix and a swaging assembly.

8 Claims, 18 Drawing Sheets

U.S. PATENT DOCUMENTS

2003/0123947 A1 * 7/2003 Eshraghi .................... 411/43

FOREIGN PATENT DOCUMENTS

DE 100 33 149 A1 * 2/2001
EP 0 028 019 A1 5/1981
GB 1341654 A * 3/2000

* cited by examiner

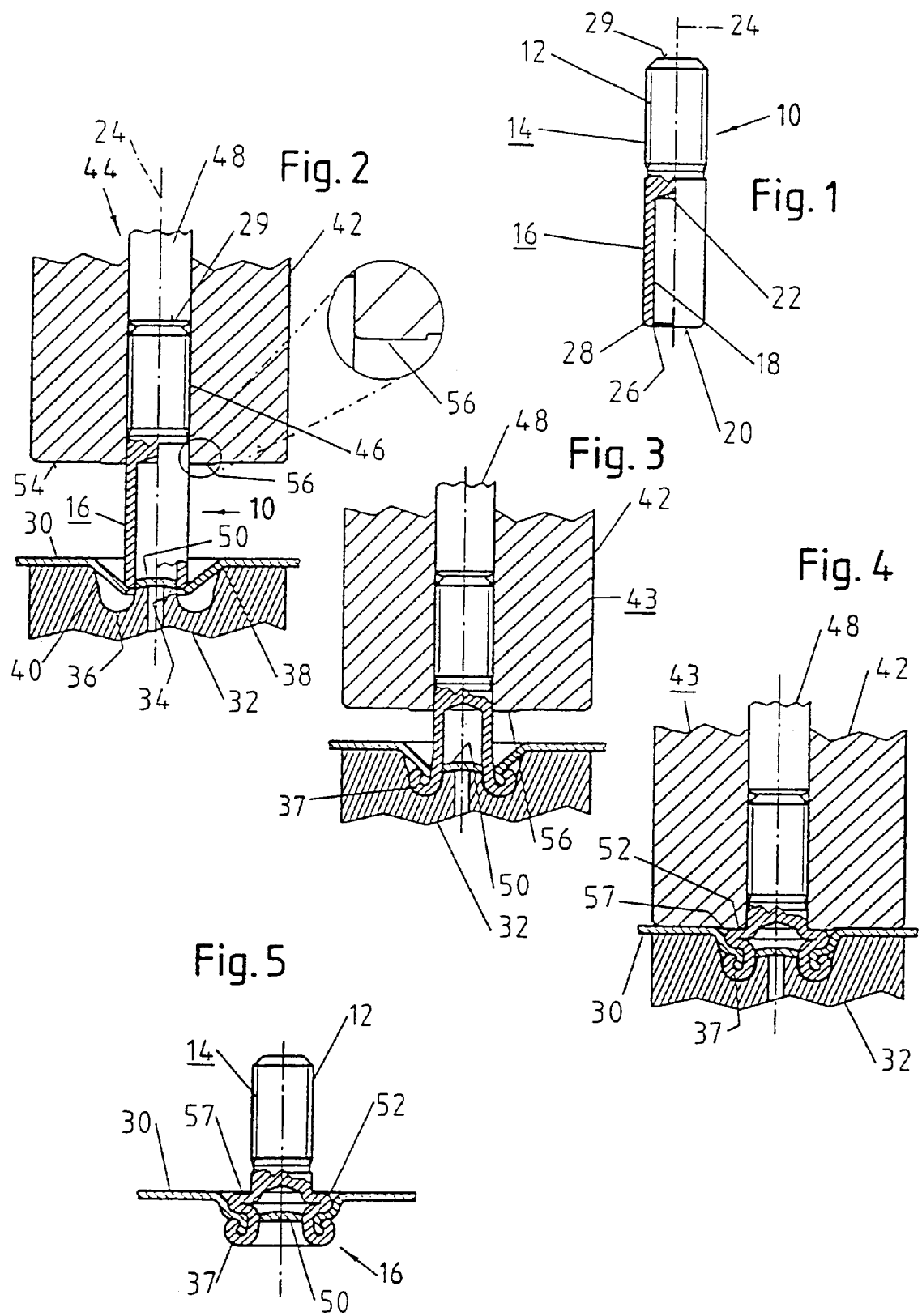

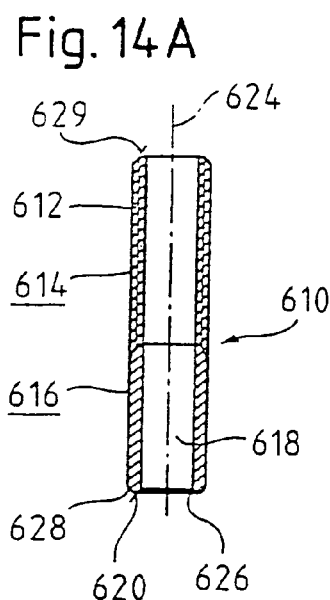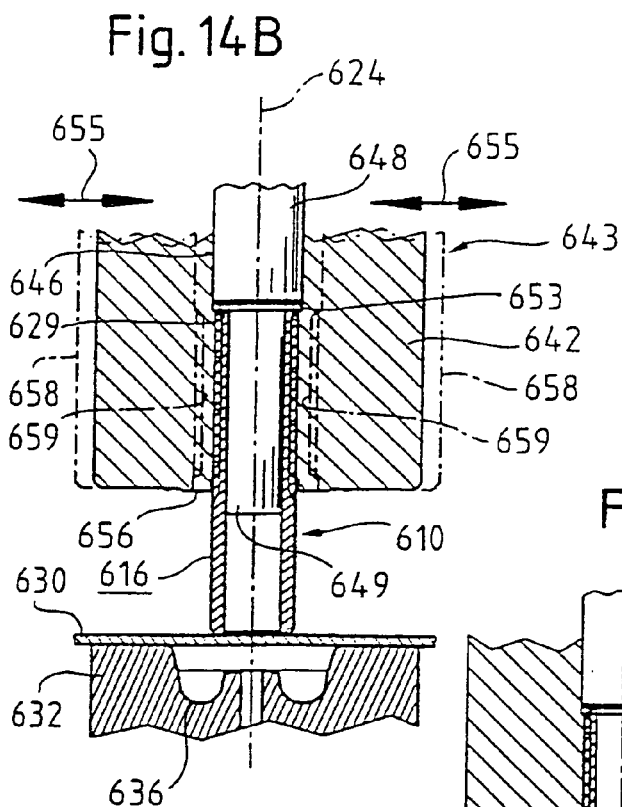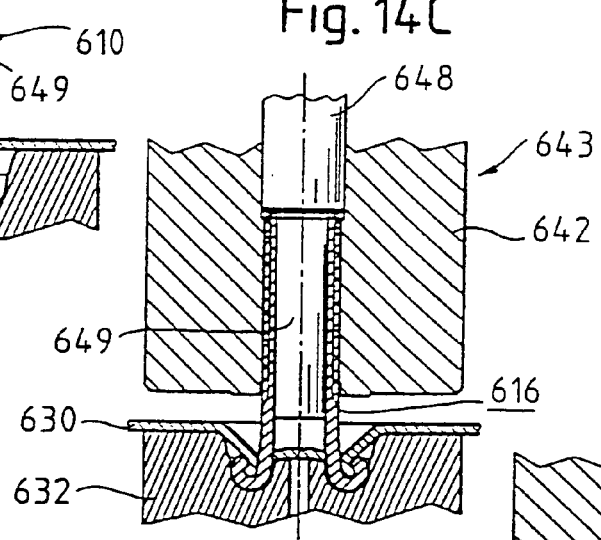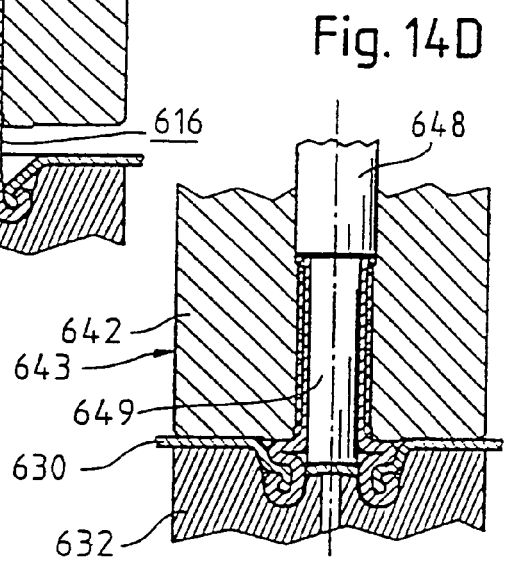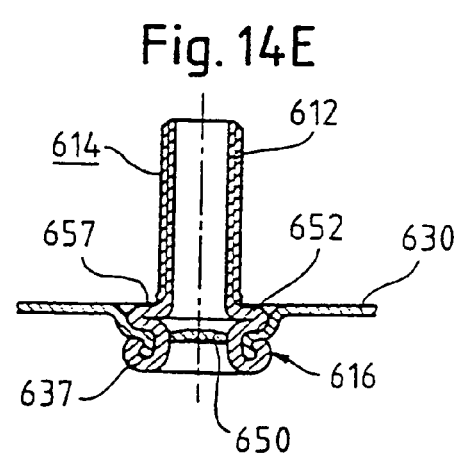

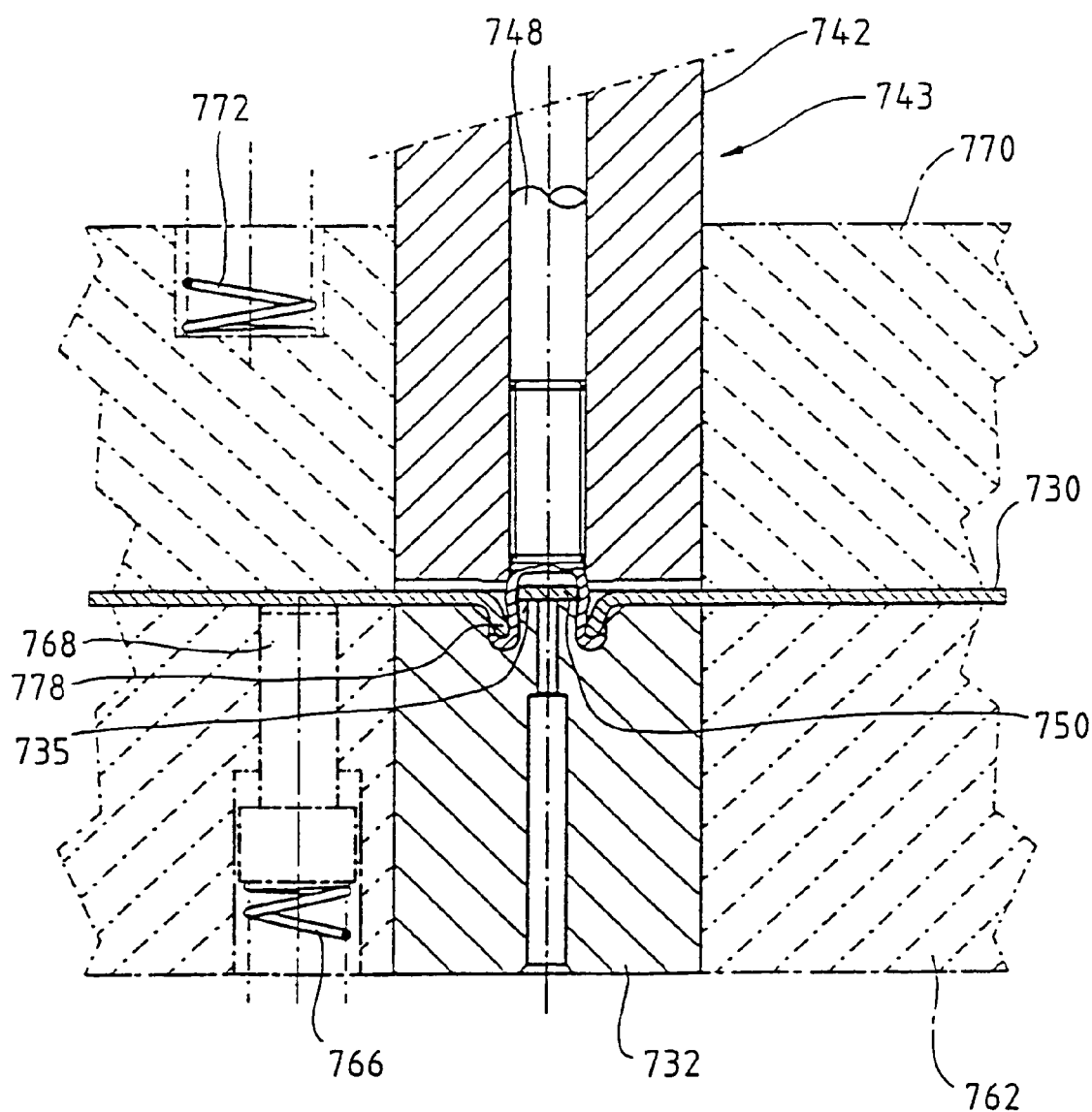

FUNCTIONAL ELEMENT, METHOD FOR FIXING IT IN A SHEET METAL PART, ASSEMBLING ELEMENT AND SWAGING ASSEMBLY

This application claims priority to DE 199 32 023.3 filed Jul. 9, 1999, and to DE 199 35 923.7 filed Jul. 30, 1999 and to DE 100 18 716.1 filed Apr. 16, 2000.

The present invention relates to a functional element comprising a shaft part and a head part designed for a riveted joint to a panel member, in particular to a sheet metal part, and a method of inserting the functional element into a sheet metal part and a component assembly comprising the functional element and the sheet metal part.

A functional element of the kind first mentioned is known, for example, from German patent 34 47 006 and is realised there as a threaded stud, with the head part being provided with a tubular piercing and riveting section which is designed to pierce a sheet metal part and to subsequently form a rivet flange, whereby the element is fastened in the sheet metal part. The head part has a flange between the tubular piercing and riveting section with an annular surface which is perpendicular to the longitudinal axis of the element and which is normally arranged just below the side of a sheet metal part adjacent to the shaft part after the insertion of the element into a sheet metal part.

The panel slug formed in the piercing of the sheet metal part is pressed into the piercing and riveting section and thus supports the riveted joint to the sheet metal part. DE PS 34 47 006, however, also describes functional elements in the form of nut elements, where the shaft part is to be understood as an extension of the head part and this is provided with a female thread. However, the shaft part does not have to be realised as a thread; many embodiments are possible, for example a guide spigot or a pin-like design to which, for example, carpets can be fasted by means of corresponding clips.

Such functional elements, i.e. in accordance with DE PS 34 47 006 C2, have proved themselves over many years and allow the production of a high-quality joint between the element and the sheet metal part. Such elements are, however, relatively costly in production and sometimes require the use of extremely precisely operating cold forming machines which work relatively slowly to obtain the desired quality. The need to use relatively expensive cold forming machines and the limited operating speed lead to relatively high production costs. Furthermore, it would be more favourable for some applications if the weight of the elements could be reduced.

It is the object of the present invention to provide functional elements which can be manufactured very economically and at a favourable cost, which preferably have a lower weight than comparable elements of the initially named kind and which also have an acceptable resistance to pull-out or twist-out for many purposes.

In accordance with a first embodiment for the satisfying of this object, provision is made in accordance with the invention that at least the head part of the element is made hollow and has at least substantially the same outer diameter as the shaft part. The element therefore has no flange between the head part and the shaft part. It is furthermore possible in accordance with a second version of the invention to make the head part with a larger or smaller diameter than that of the shaft part, with a transition taking place with a change in the diameter between the head part and the shaft part, but with no flange part in the conventional sense being present.

The function of the flange part in the known elements is, on the one hand, to provide a sufficient area which prevents the element from becoming loose in the sheet metal part and, on the other hand, also to form a surface on which further sheet metal parts or other components can be fastened, for example, if the element in question is a bolt element, by a nut which is screwed onto the shaft part of the functional element having a thread.

In the functional elements in accordance with the invention, this flange is initially not present on the actual functional element. When the functional element is inserted into the sheet metal part, the end of the functional elements pierces the sheet metal part, as with the elements known per se, and formed into a rivet flange on the side of the sheet metal part remote from the shaft part of the element. Subsequently, the functional element is compressed in the longitudinal direction such that a part of the hollow head part is formed into an annular fold or annular bulge which now serves as a flange and assumes the functions of the conventional flange described above.

Particularly preferred embodiments of the functional element can be found in claims 2 to 11.

As the head part in the functional element has at least substantially the same outer diameter as the shaft part, the demands on manufacturing it as a cold formed part are substantially lower than with the manufacture of a head part with a flange whose diameter is substantially larger than that of the shaft part. Thus, lower priced cold forming machines with a faster operation can be used, whereby the production costs can be cut.

Furthermore, the functional element cannot only be manufactured in an economic manner by cold forming, but also by high-pressure forming methods from lengths of tubing. Moreover, a variety of other, lower priced manufacturing procedures are possible. Although only a hollow head part is necessary for the attachment of the part to a workpiece, the functional element can easily be manufactured overall as a tubular part. A manufacture with a larger inside diameter in the hollow head part than in the shaft part can also be realised at favourable cost, particularly when a tube is used as the starting material.

As indicated above, in the present invention, the actual flange is only formed at a later point. As the sheet metal part is clamped in a form-locked manner within a relatively large-area mount between the rivet flange on the one hand and the annular fold on the other, the functional element in accordance with the invention has a good resistance to twisting. The embodiment in which the panel slug is clamped inside the rivet flange increases the security against rotation even further and also increases the resistance to being pulled out.

Should it be necessary to increase the security against rotation even further, this can be done in a number of different ways. On the one hand, smaller features providing security against rotation, such as grooves or noses, can be provided in the region of the head part forming the rivet flange; on the other hand, radially extending noses can be provided either in the die to form the rivet flange and/or in the end face of the plunger forming the annular fold which then also lead to a joint deformation of the sheet metal part and the adjoining regions of the rivet flange and/or the annular fold which serve to increase the security against rotation. It is also possible to equip the surface of the annular fold with sharp, radially extending noses or the like which provide an electrical contact to a connecting terminal. Such noses can be provided either on the outer surface of the head part before the insertion of the element or formed or embossed in the exposed surface of the annular fold only subsequently when the annular fold is formed.

Particular advantages and preferred embodiments of the functional element and of the method of inserting the element into a sheet metal part, of the component assembly made in this way, of the die used to manufacture the component assembly and of the plunger arrangement used can be seen from the claims and the following description.

The invention is described in more detail below by way of embodiments and with reference to the enclosed drawing in which are shown:

FIG. 1 a view, partially cut away in the longitudinal direction, of a functional element in the form of a bolt element;

FIG. 2 the first step in the insertion of the functional element into a sheet metal part;

FIG. 3 an intermediate stage in the insertion of the functional element into a sheet metal part;

FIG. 4 the end of the insertion method prior to the opening of the press or caliper used therefor;

FIG. 5 a partially cut-away view of the finished component assembly, i.e. the result after the end of the method step in accordance with FIG. 4;

FIG. 6 a representation of a functional element with a head part having a greater diameter than that of the shaft part;

FIG. 7 the element of FIG. 6 in the assembled state;

FIG. 8 a representation similar to FIG. 6, but where the head part has a smaller outer diameter than the shaft part;

FIG. 9 the functional element of FIG. 8 in the assembled state;

FIG. 10 a representation similar to FIG. 1, but at a larger scale and of a hollow element;

FIG. 11 a view, partially cut away in the longitudinal direction, of a further functional element in accordance with the invention in the form of a nut element;

FIG. 12 the nut element of FIG. 11 in the assembled state;

FIG. 13 a functional element partially cut away in the longitudinal direction which is made as a pin to receive a spring clip;

FIG. 14 shows in FIGS. 14B, 14C and 14D a modified setting head designed for the insertion of the tubular element in accordance with FIG. 14A into a sheet metal part in such a way that no damage to the thread cylinder need be feared, with FIG. 14E showing the completed component assembly;

Figure 16A:
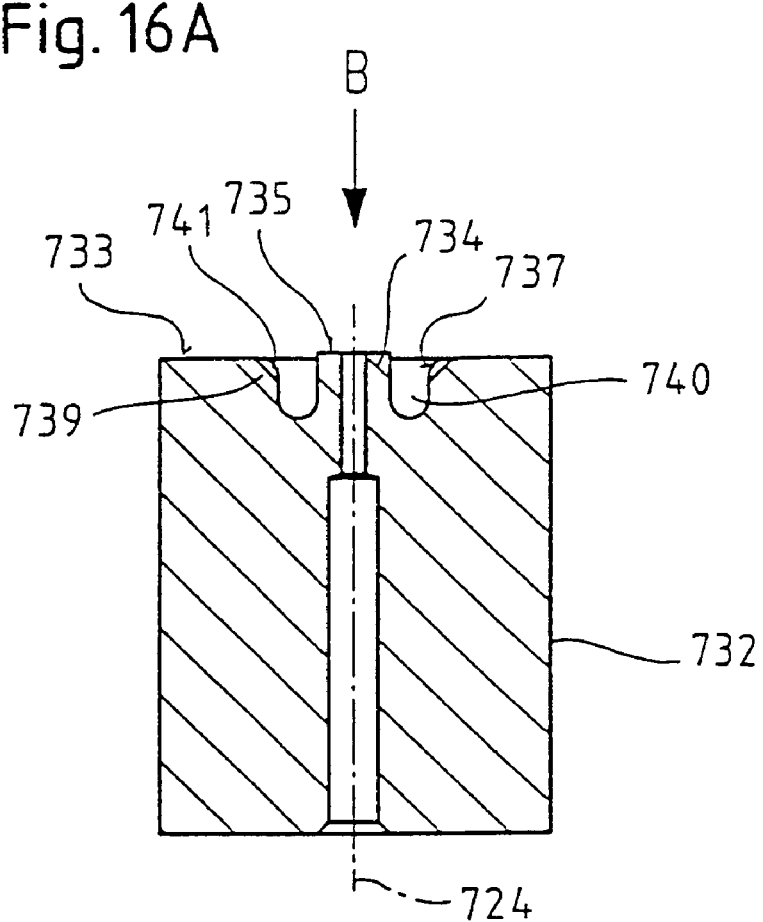
Figure 16B:
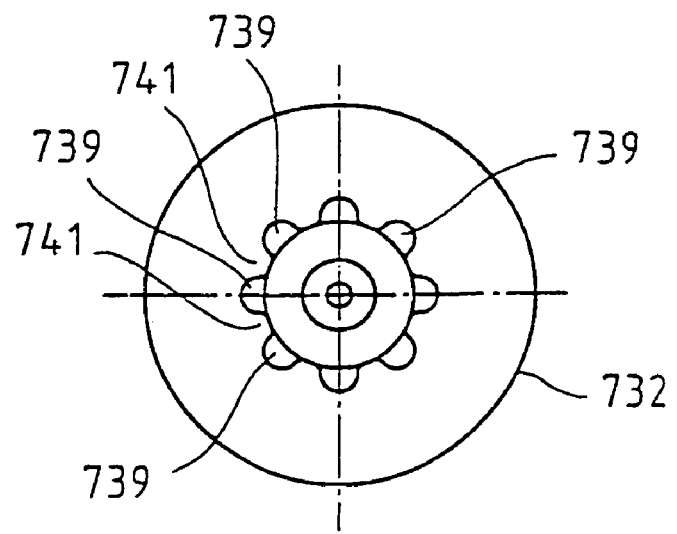
Figure 17A:
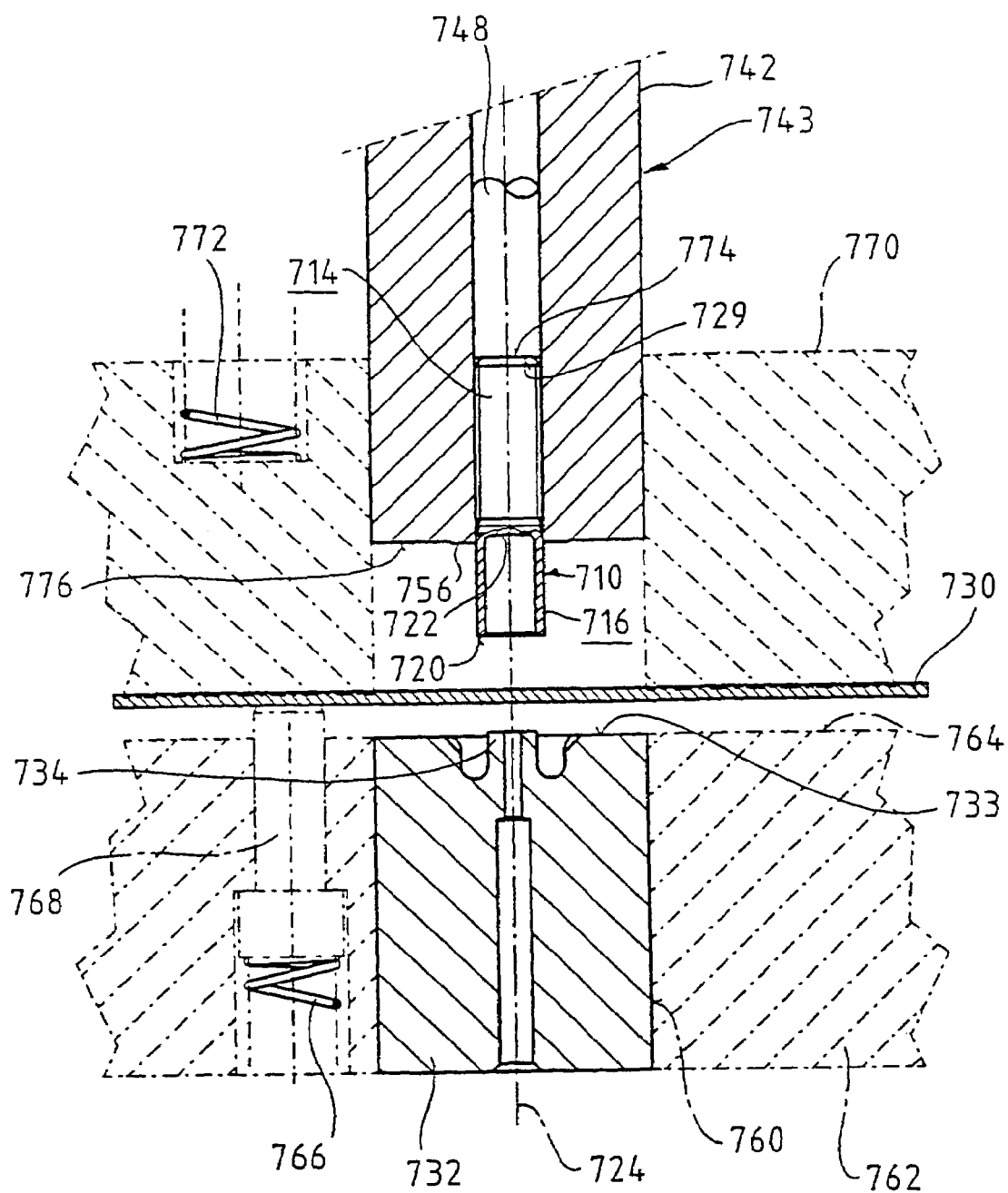
Figure 17B:
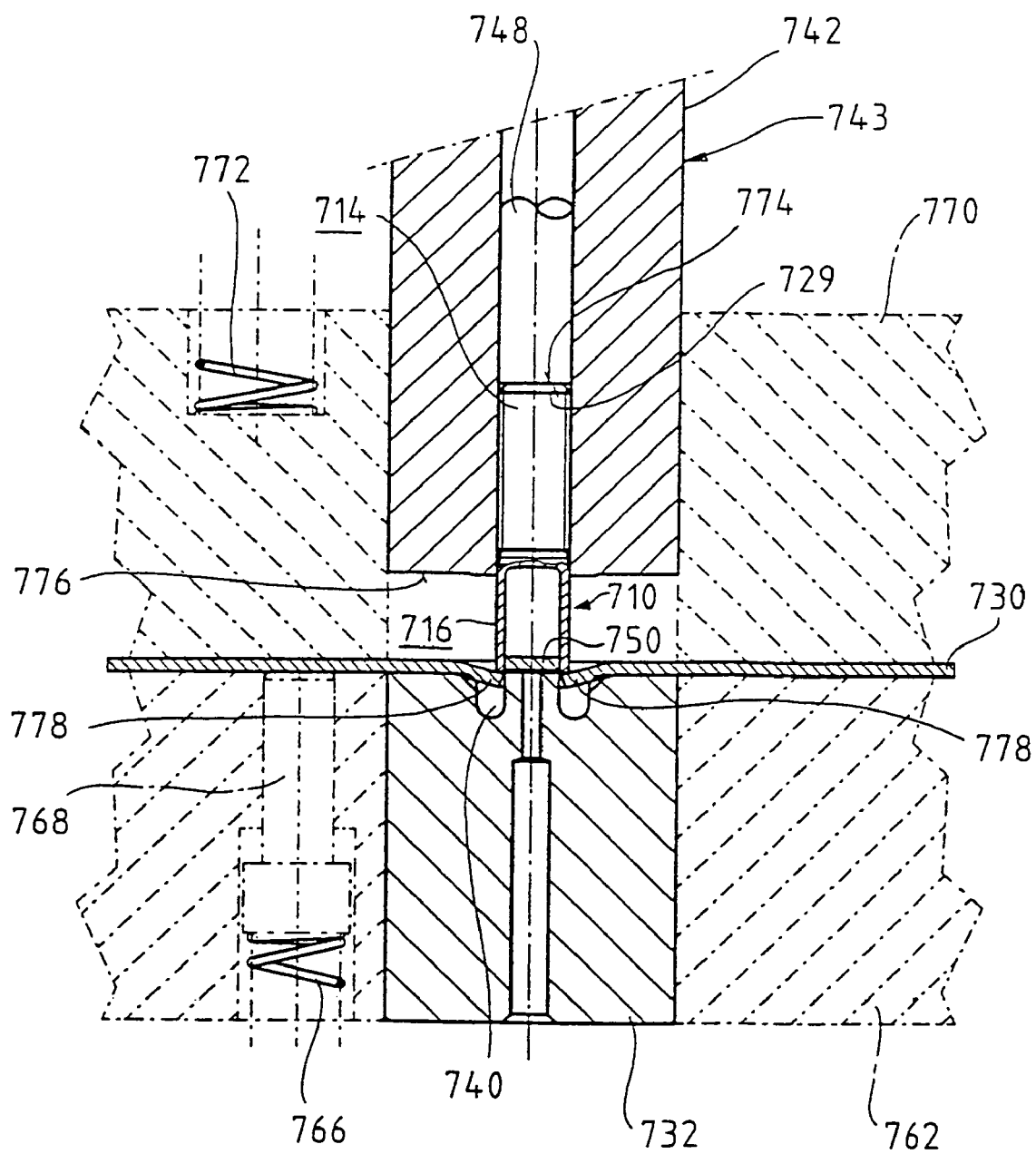
Figure 17C:
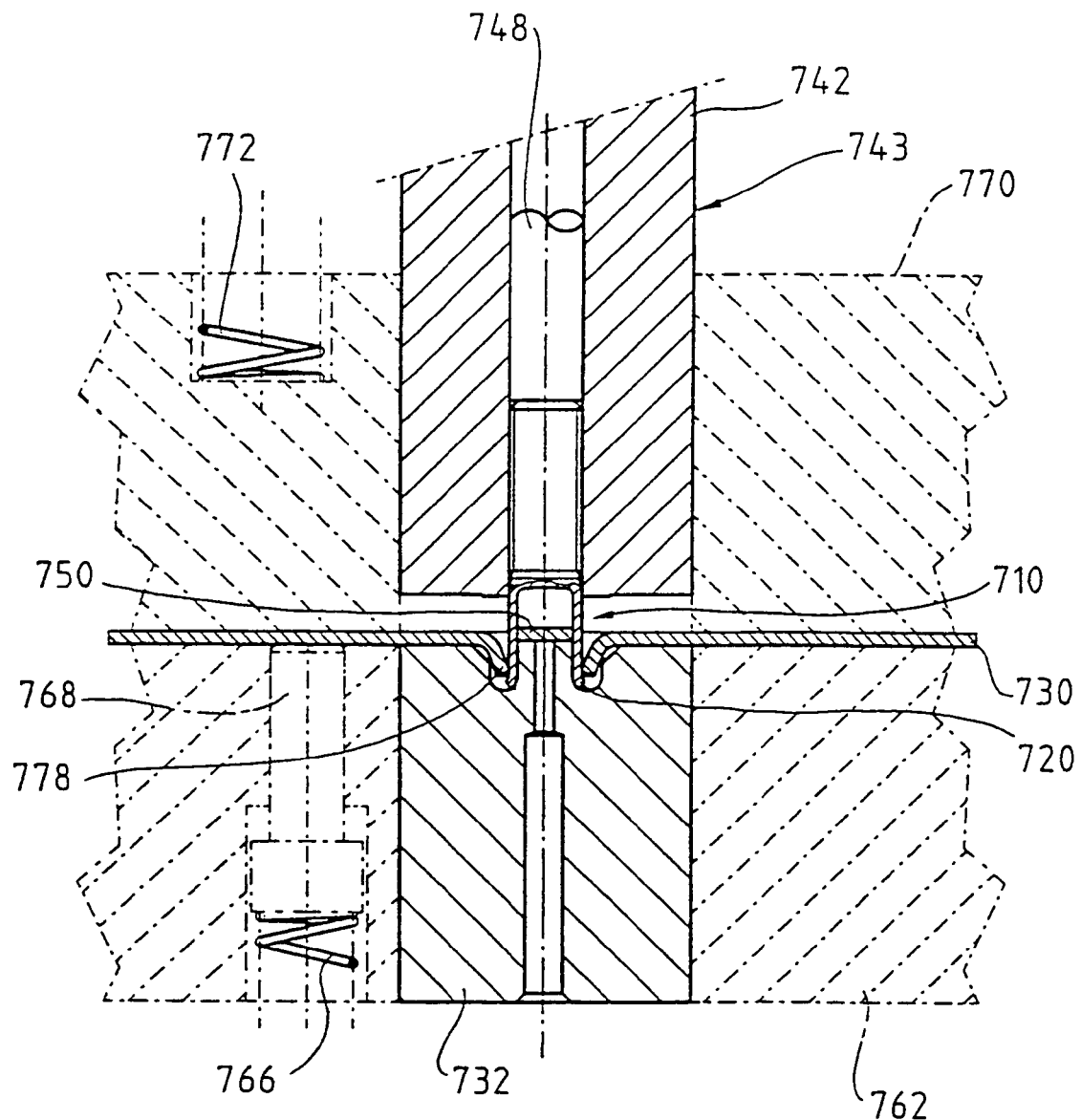
Figure 17D:
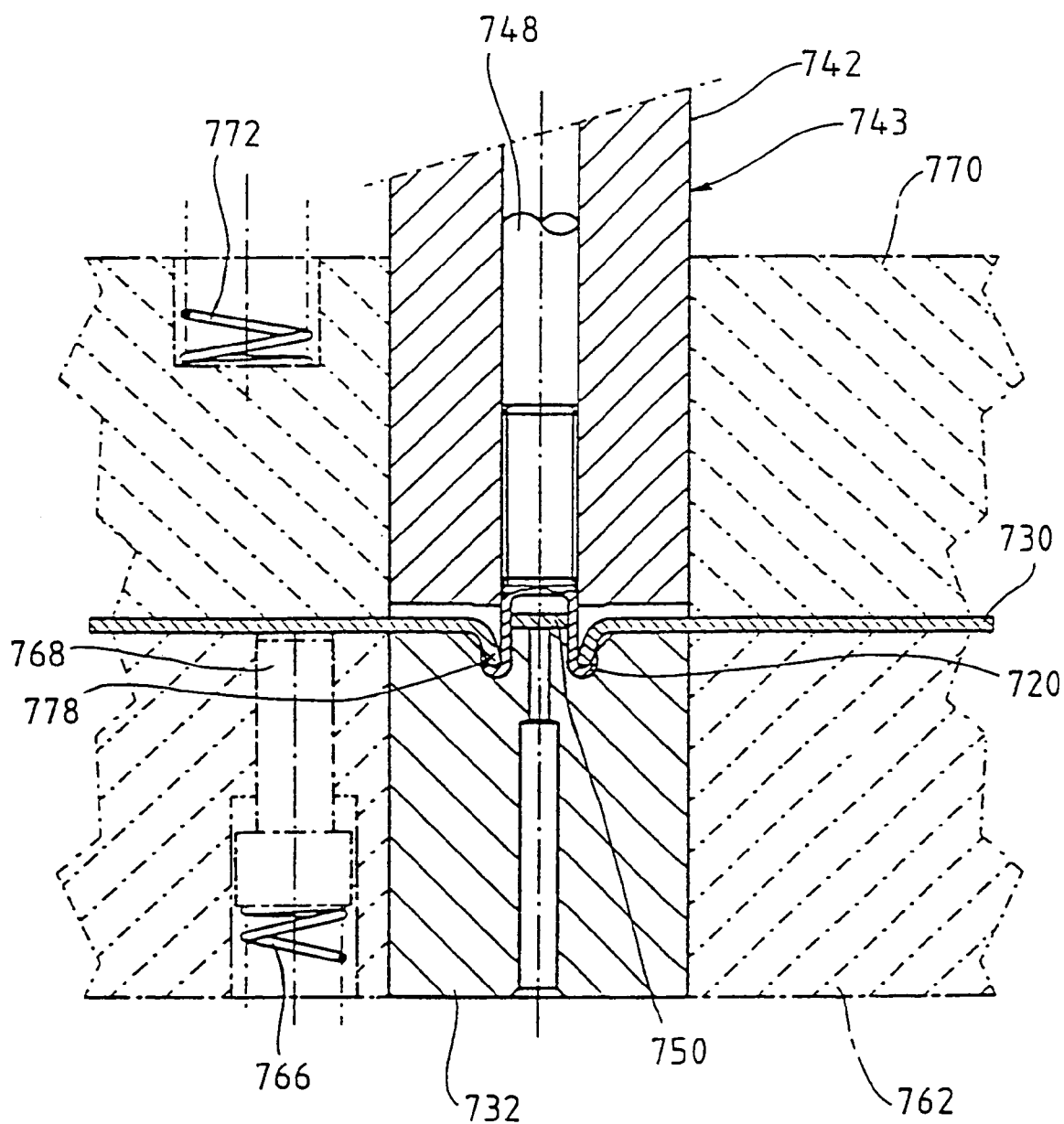
Figure 17F:
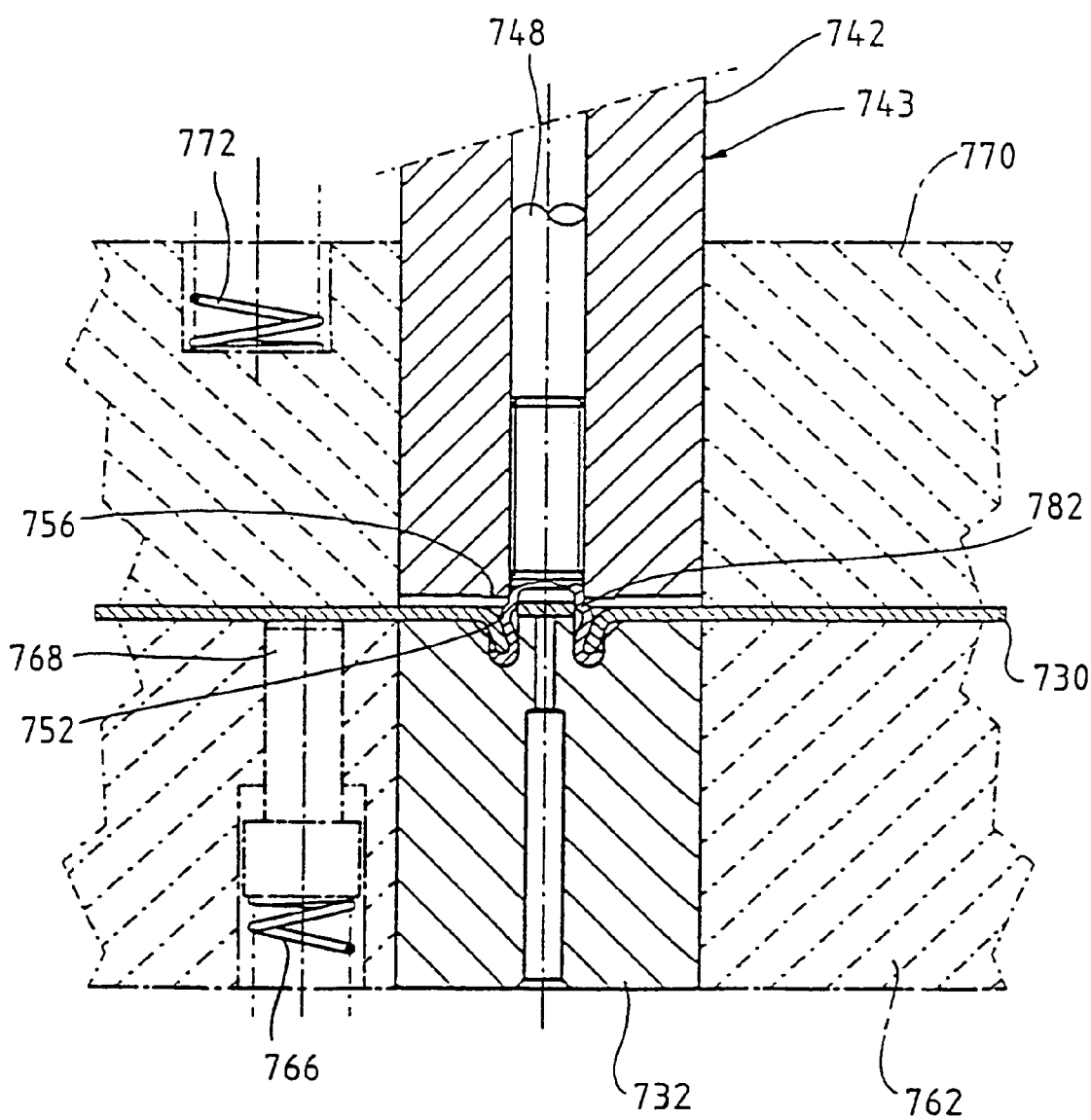
Figure 17G:
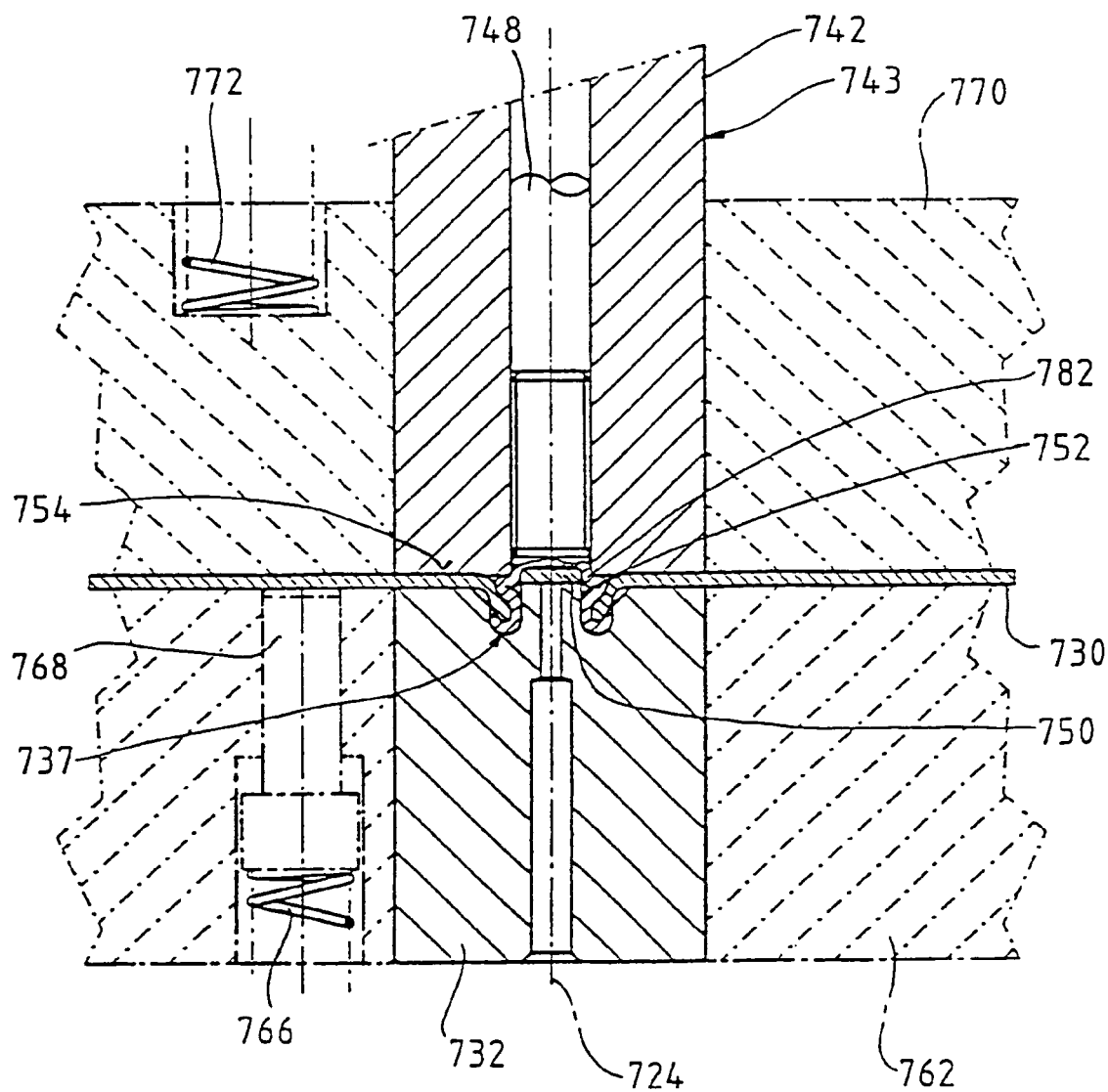
Figure 17H:
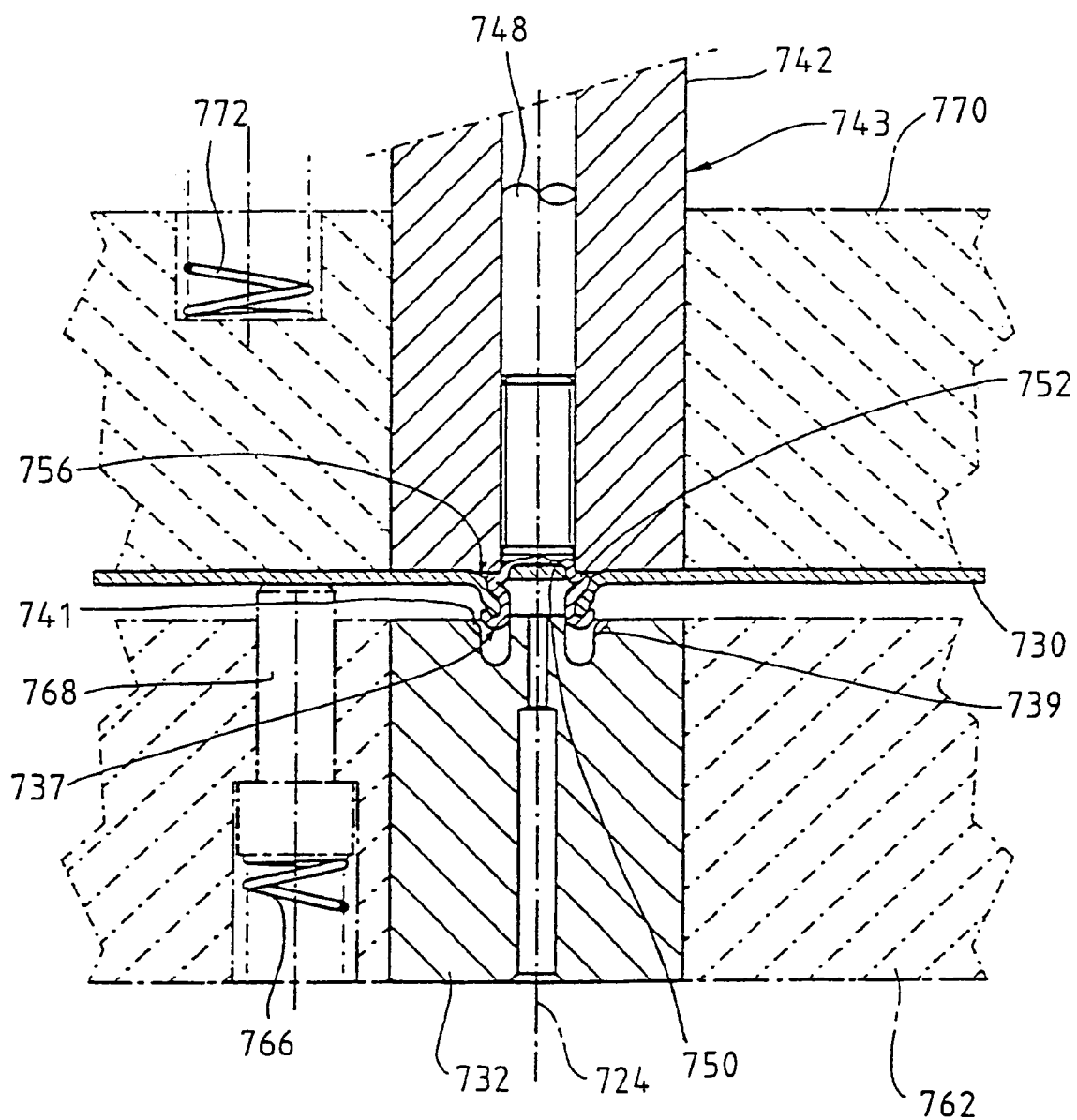
Figure 17I:
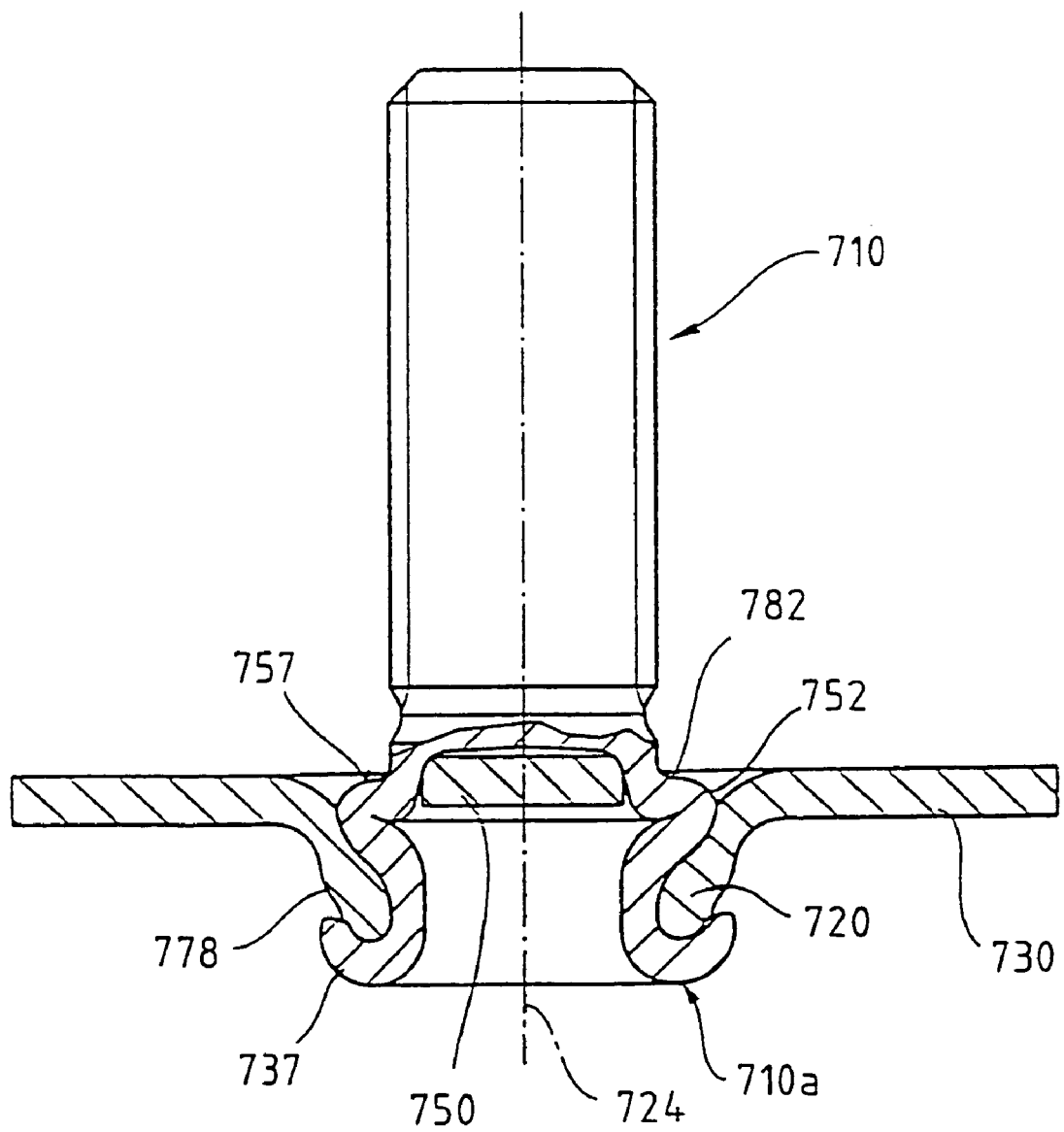
Figure 18A:
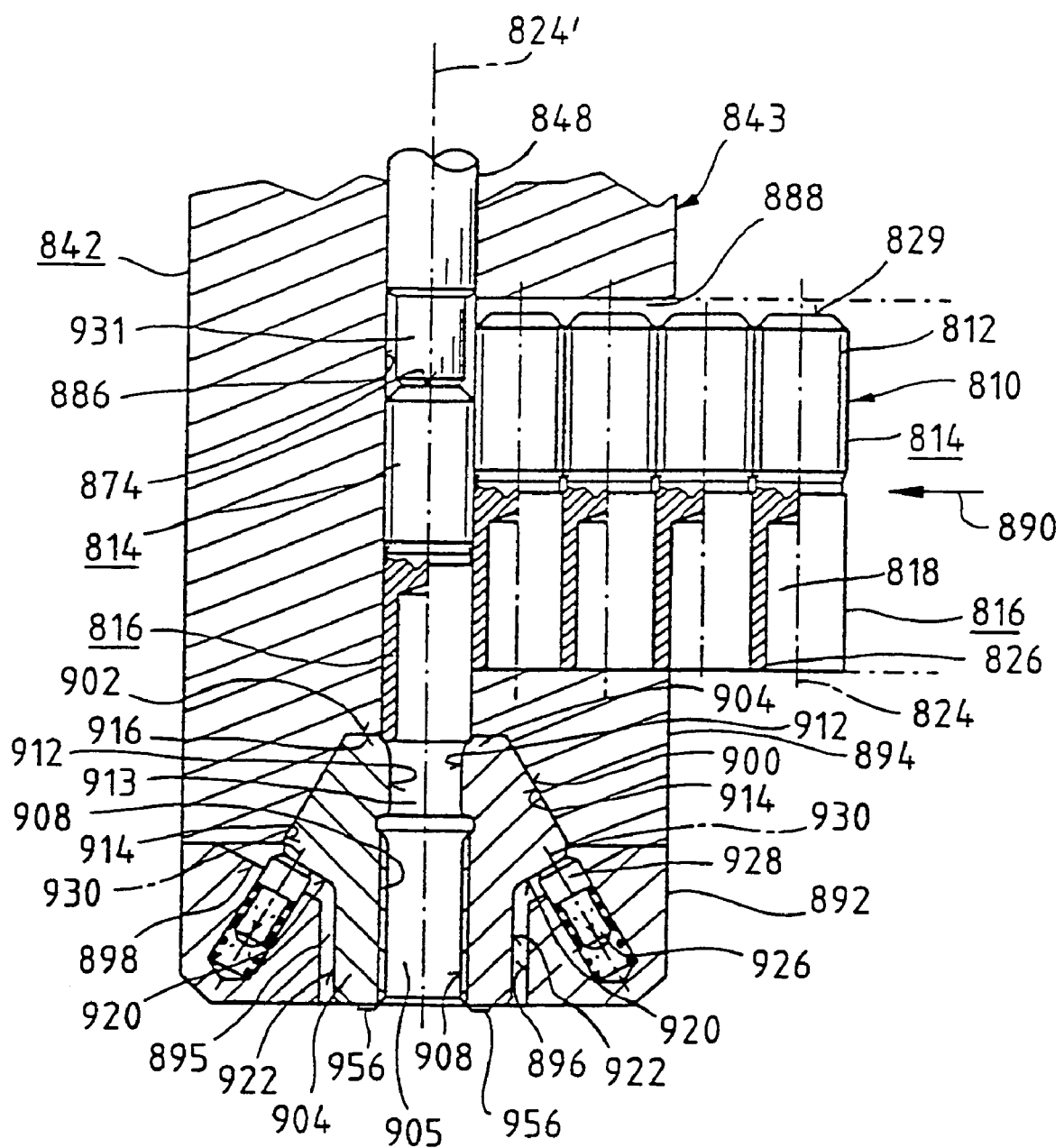
Figure 18B:
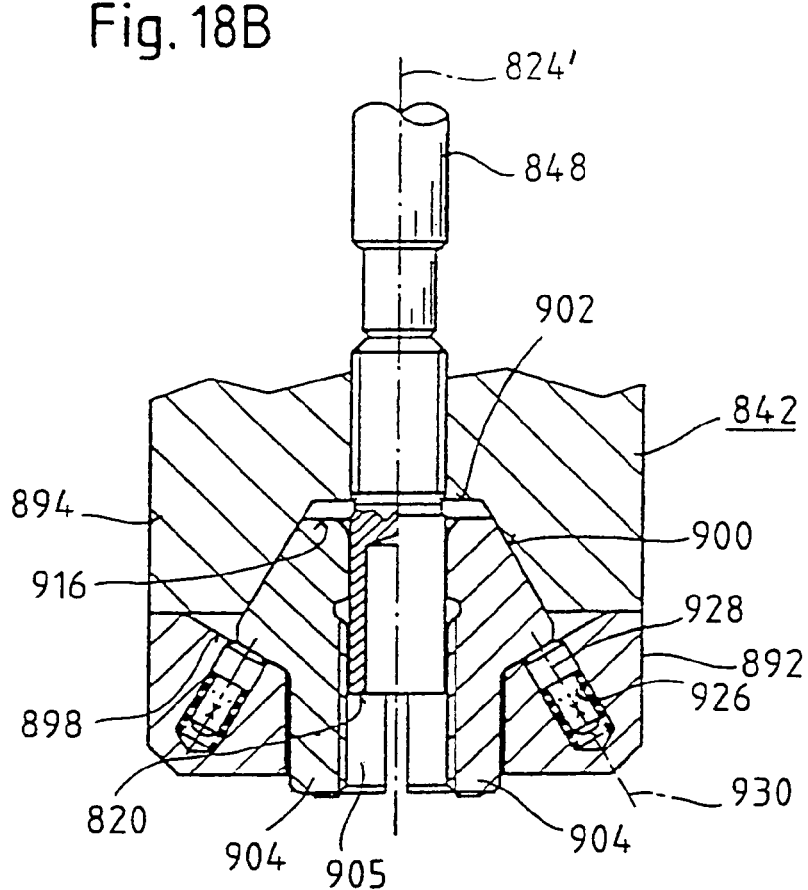
Figure 18C:
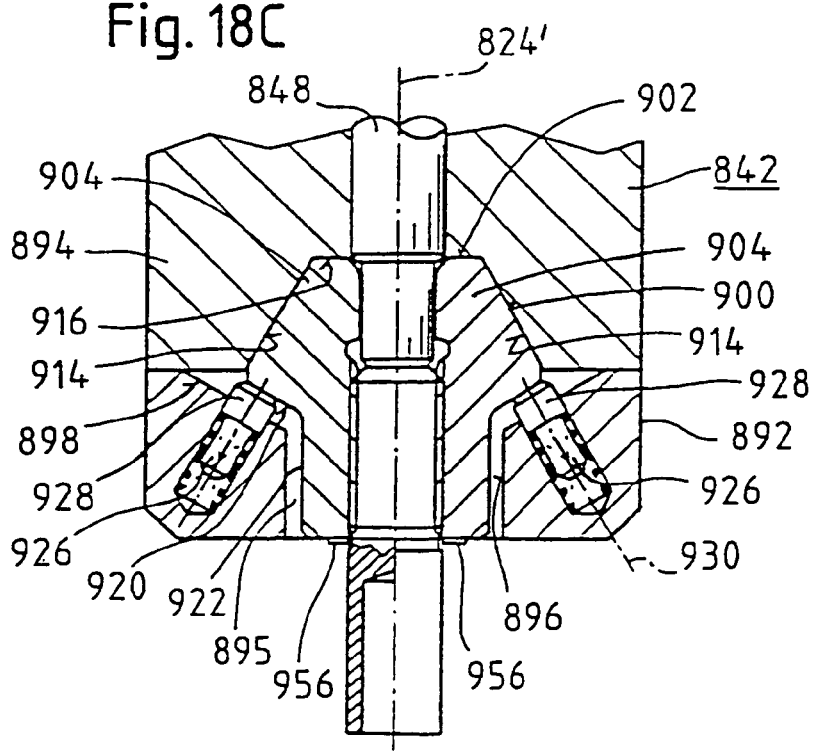
Figure 19:
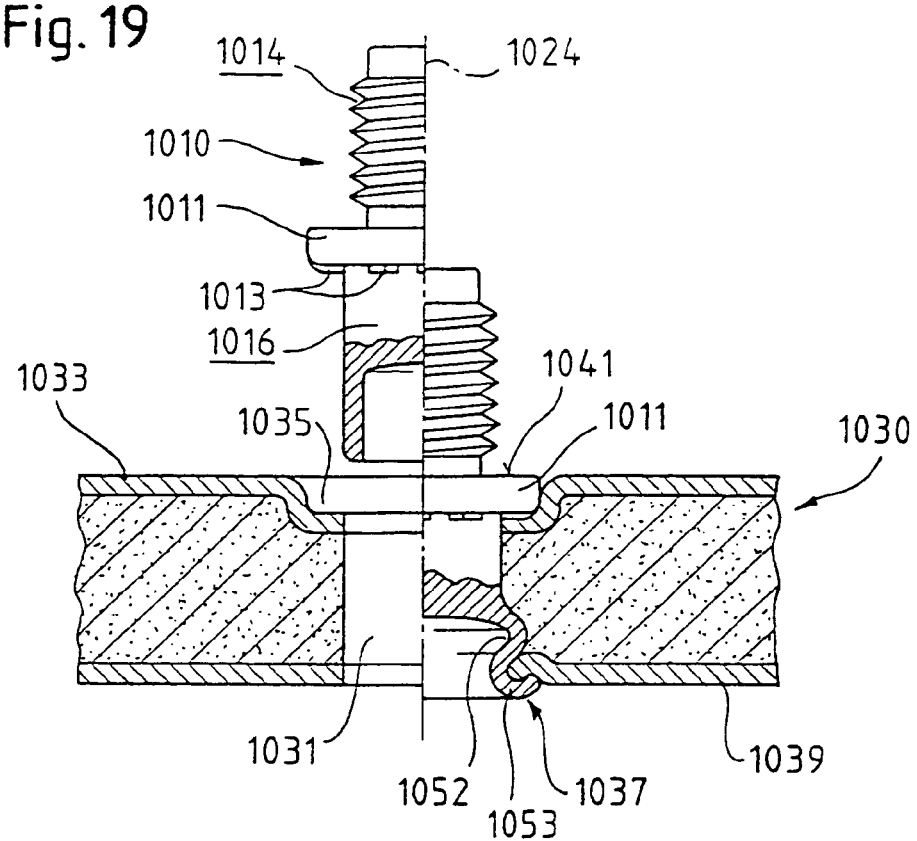
Figure 20:
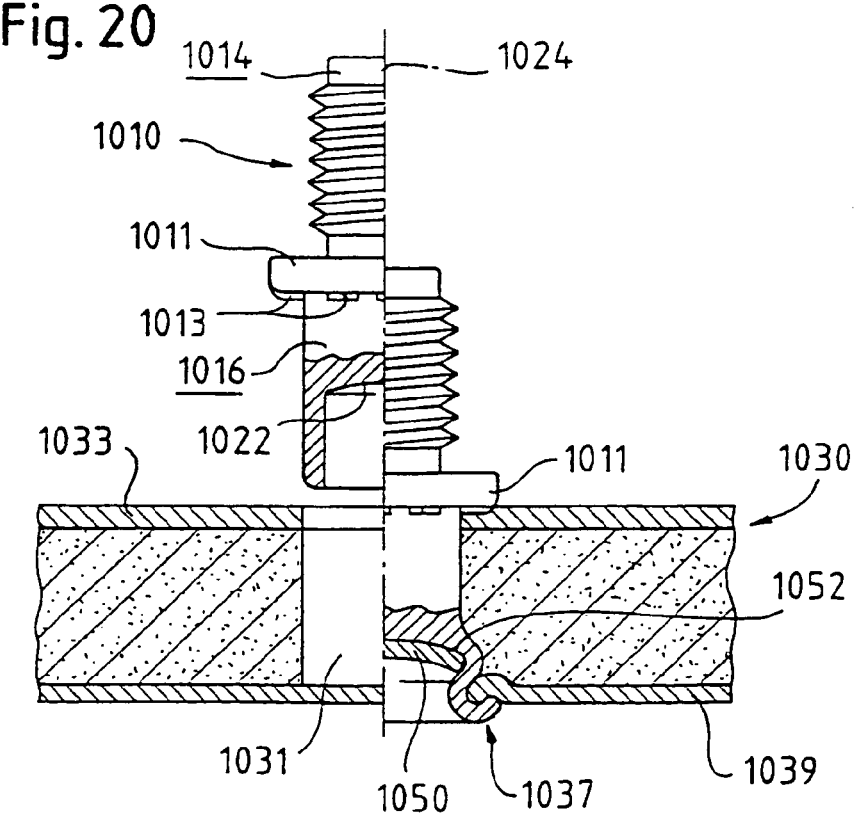

FIG. 16A an axial section through a die in accordance with the invention;

FIG. 16B an end view of the die of FIG. 16A seen in the direction of arrow B;

FIG. 17 a sequence of drawings in which FIGS. 17A to 17H show the method preferred in accordance with the invention of attaching the functional element in accordance with the invention and using the die preferred in accordance with the invention, with FIG. 17I illustrating the completed component assembly in a partially cut-away form;

FIG. 18A to FIG. 18C a preferred embodiment of the plunger arrangement in accordance with the invention which is preferably used in the method in accordance with FIG. 17;

FIG. 19 a partially cut-away view to illustrate the attachment of an element in accordance with the invention to a sandwich-like component, the element and the component being shown prior to the attachment of the element on the left side of the central longitudinal axis and after the attachment of the element on the right side of the central longitudinal axis; and FIG. 20 a schematic representation similar to that of FIG. 19, but with a modified kind of sheet metal preparation.

The functional element 10 of FIG. 1 comprises a shaft part 14 provided with a male thread 12 and a hollow head part 16 having at least substantially the same outer diameter as the thread cylinder of the shaft part 14. The male thread 12 shown here is a rolled thread, i.e. the thread formation has been effected by rolling.

A circularly cylindrical hollow space 18, which is located within the hollow head part 16, leads from the end 20 of the head part 16 remote from the shaft part 14 up to directly below the thread cylinder and ends there in a transverse wall 22. The hollow space 18 here has the form of a bore. The shape of the transverse wall 22 corresponds to the base of a bore made with a twist drill, although the hollow space 18 and the transverse wall 22 do not necessarily have to be made with a twist drill, even though this does represent one possibility. The hollow space and the transverse wall could, for example, be made by means of a cold forming process. The longitudinal axis of the functional element 10, which is realised here as a bolt element, is designated with 24.

The element 10 is made at the end 20 exactly like the corresponding end of the piercing and riveting section of the functional element in accordance with DE PS 34 47 006 C2, i.e. it has an inner cutting face 26 and an outer, rounded off punching and drawing edge 28.

In FIG. 1, the cutting face 26 is made very small. As a rule, it is, however, made in accordance with the conical cutting face 426 of the embodiment in accordance with FIG. 11.

FIGS. 2, 3 and 4 now show three different stages in the insertion of the functional element 10 in accordance with FIG. 1 into a sheet metal part 30. The insertion method is described in more detail below with reference to the further FIGS. 15–18, which represent the currently preferred embodiment in detail. The present description is intended as an introduction for a knowledgeable reader.

As is shown in FIG. 2, the sheet metal part 30 is supported at the bottom on a die 32 which is equipped with a centraly disposed cylindrical plunger projection 34 which is designed in accordance with the plunger projection of the corresponding die in accordance with DE PS 34 47 006 C2. This plunger projection is surrounded by a rounded annular depression 36 which merges into an annular recess 40 of a larger diameter at the end face 38 of the die remote from the sheet metal part 30. The die 32 is overall very similar to the die 180 described in DE PS 34 47 006.

The die 32 is located in a lower tool of a press (not shown). The sheet metal part is clamped against the end face 38 of the die by a, for example, tubular hold down member, which is not shown, but which is arranged concentrically to the cylindrical outer plunger 42 of the setting head 44. That is, the sheet metal part 30 is clamped tight outside the annular recess 40. The shaft part of the functional element 10 is located in the cylindrical guide passage 46 of the setting head 44, while the head part 16 projects out of the cylindrical outer plunger 42. An inner plunger 48, which presses onto the end 29 of the shaft part 12, is arranged within and concentric to the tubular outer plunger 42. Although the inner plunger 48 can be drawn back with respect to the outer plunger for the insertion of the respective functional elements, the relative position of the inner and outer plungers 48, 42 remains constant for the process steps in accordance with FIGS. 2, 3 and 4. The same applies to the apparatus to be described below.

In the stage of the process step in accordance with FIG. 2, the end face 20 of the functional element has pressed the sheet metal part into the annular recess 40 of the die 32 under the pressure of the inner plunger 48 and drawn a shallow, approximately conical recess in the sheet metal part 30. In the stage of FIG. 2, the plunger projection 34 in cooperation with the cutting surface 26 at the end of the head part 16 of the functional element 10 has cut out a panel slug 50 from the sheet metal part.

It can be seen from FIG. 3 that the plunger arrangement 43 comprising the inner plunger 48 and the outer plunger 42 has travelled further downwards, with the free end region of the hollow head part of the element 10 being formed into an annular rivet flange 37 around the downwardly drawn rim of the aperture of the sheet metal part as a result of the rounded annular depression or roll surface 36 in the die. The hole in the sheet metal part has a marginal region in this stage of the process which is similar to the mouth of a trumpet.

In the continued course of the joint downward movement of the inner plunger 48 and the outer plunger 42, the cylindrical wall of the head part 16 is compressed in the region directly beneath the shaft part 14 such that an annular fold 52 is formed, as can be seen from FIG. 4. The constraints to which the element is subjected due to the guiding by the outer plunger 42 on the one hand and due to the punched edge and the panel slug on the other ensure that the deformation takes place as shown in FIG. 4.

It can be seen from FIGS. 2 and 3 that the outer plunger 42 has an annular nose 56 at its end 54 with a face extending perpendicular to the longitudinal axis 24 of the functional element. This annular nose 56, which is not absolutely necessary, presses on the annular fold in the method stage in accordance with FIG. 4 and ensures that a clear fold is made here so that the material of the wall of the head part is folded like a hair grip, i.e. through 180°, and the two layers of material formed in this way fully contact one another. Furthermore, the annular nose ensures that the annular surface 57 of the ring fold formed in this way lies slightly below the plane of the sheet metal part 30. The ring flange 52 formed in this way now has the function of a flange which was already present in the starting stage in the elements previously known. It is also ensured by the annular nose 56 that the material package is compressed in an axial direction in the region of the form-locked joint of the hollow head part 16 of the functional element to the sheet metal part 30 and is thus made in an extremely stable and strong manner. Optionally, the annular nose 56 can be equipped with forming features which, on the one hand, lead to a selected, interlocked arrangement between the sheet metal part 30 and the hollow head part 16 which promotes the security against rotation and which, on the other hand, can also be designed in such a way that, for example, noses are created in the upper annular surface of the annular fold of FIGS. 4 and 5 which ensure a high-quality electrical contact, for example when the functional element is used as a ground connection element. As an alternative or supplement to this type of realisation of the security against rotation, the element can also be bonded to the sheet metal part by means of an adhesive. For example, the functional element 10 can be coated with a pressure-sensitive adhesive in the region of the head part 16 which is only activated under pressure when the functional element is attached to the sheet metal part.

In the stage of FIG. 4, the insertion of the functional element 10 into the sheet metal part 30 is complete. The press opens and the component assembly produced in this way then has the shape visible from FIG. 5.

In this description, it is initially assumed that the die 32 is a die which is arranged in the lower tool of a press. In this case, the setting head 44 is fastened either to the upper tool of the press or to an intermediate plate of the press. The die 32 can, however, equally be arranged on the intermediate plate and then cooperate with a setting head which is arranged on the lower or upper tool of the press. It is equally possible to attach the die 32 to the upper plate of the tool and to mount the setting head to an intermediate plate or to the lower tool of the press. Furthermore, the setting head 44 and the die 23 can be pressed onto one another by a robot or be brought together by other devices.

The further FIGS. 6 to 13 now show different possible aspects of the functional element in accordance with the invention and are described in more detail below. In all following examples, the same reference numerals are used as for the embodiment of FIGS. 1 to 5, but increased for each embodiment successively by the base number 100 for clear identification. It is, however, understood that features characterised by the same two last numerals always have the same or a corresponding function as in the embodiment in accordance with FIGS. 1 to 5. Such features are only described separately if a different aspect has a special importance.

Figure 6:
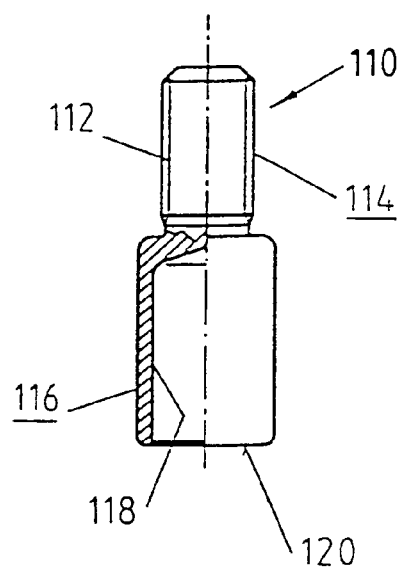

FIG. 6 shows that it is not absolutely necessary for the head part 116 of the functional element 110 to have the same diameter as the shaft part 114. The hollow head part in FIG. 6 has a larger diameter than the shaft part 114. Here, too, the functional element 110 does not have an actual flange in the starting state. The flange is rather only formed during the insertion of the functional element 110 into a sheet metal part, as is described in connection with the first embodiment in accordance with FIGS. 1 to 5 and shown in FIG. 7.

Figure 7:
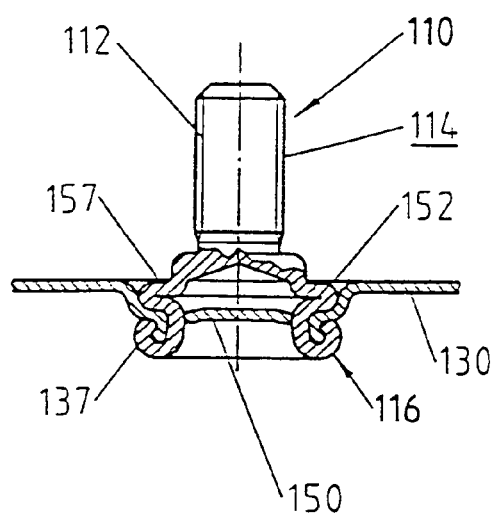

FIG. 7 now shows the functional element 110 of FIG. 6 in the assembled state. It can be seen clearly here that the annular fold 152 forms a flange as in the embodiment in accordance with FIG. 5.

Figure 8:
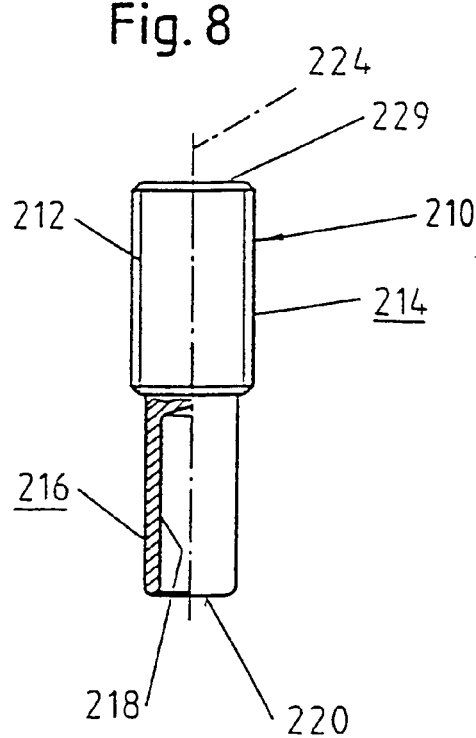
Figure 9:
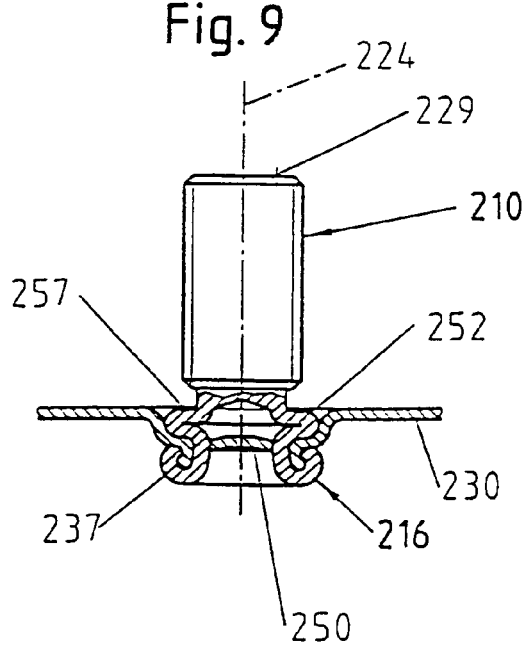

In the embodiment of FIG. 8, the head part 216 has a smaller outer diameter than the outer diameter of the thread cylinder of the shaft part 214 of the functional element 210. The functional element 210 in such an embodiment also initially lacks a flange which contacts the sheet metal part. A flange is nevertheless formed into an annular fold 252 during the insertion of the functional element into a sheet metal part due to the compression of the hollow head part 216, as can be seen from FIG. 9.

Figure 10:
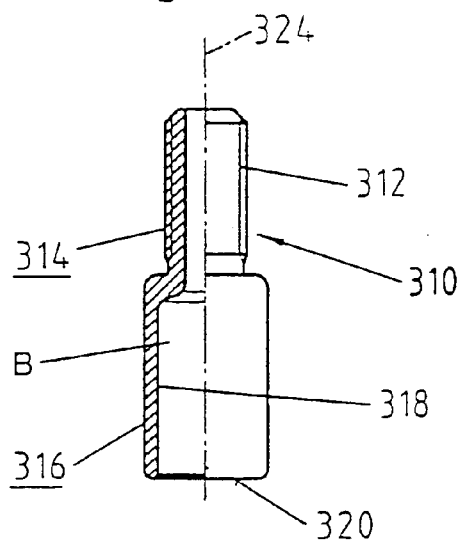

FIG. 10 now shows that the functional element 310 can also be made in tubular form. The functional element 310 of FIG. 10 is actually made so that the shaft part 314 is also hollow. Such a functional element has the special advantage that it can be made without problems from a tubular section, with the expansion shown in FIG. 10 of the bore B of the tube in the region of the hollow space 318 being able to be made without any problem, for example either during cold forming or in a high-pressure forming procedure inside a corresponding outer mould. The male thread 312 of the functional element 310 of FIG. 10 can, as in the other prior examples, be produced in a generating process; however it can also be made by a high-pressure forming process inside a mould. Thus the male thread shown here is a compression formed thread, i.e. has been made by compression forming. This is possible due to the use of a tubular section or part of a tubular section as the starting material, as the required internal high pressure can be introduced without problem in all longitudinal regions of the tube or in a tube length corresponding to the length of the functional element via the continuously hollow internal space of the tube.

In the state fitted into a sheet metal part, the form-locked joint of the head part 316 to the sheet metal part corresponds to the previous embodiment in accordance with FIG. 5.

Figure 11:
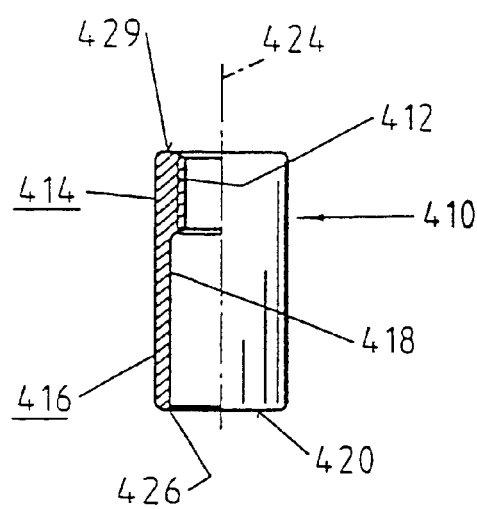

FIG. 11 shows a further embodiment version similar to the embodiment of FIG. 10, but in this case the element is provided with a female thread 412.

Figure 12:
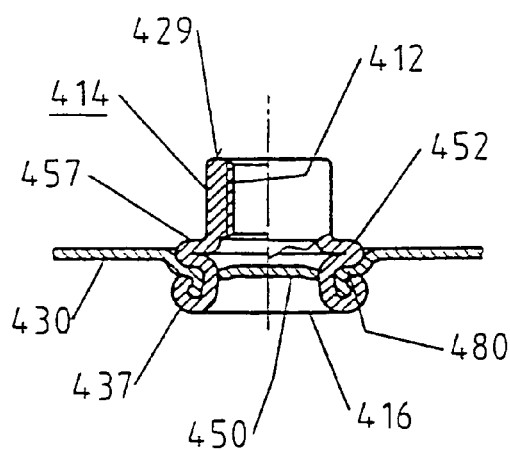

FIG. 12 shows the assembled state of the functional element in accordance with FIG. 11. It can be seen that the hollow head part 416 is deformed in exactly the same way as in the prior embodiments—with the difference that in this case the upper annular surface 457 of the annular fold 452 is arranged a little above the sheet metal part. However, this is not absolutely necessary. The corresponding surface could equally well be arranged beneath the plane of the sheet metal part 430 or at the same height as the plane of the sheet metal part.

It can also be seen in FIG. 12 that the panel slug 450 closes the central passage of the hollow functional element 410 in the region of the rivet flange 437 so that a sealing is performed at this point. The panel slug can, however, also be removed.

The embodiment in accordance with FIG. 12 then has the particular advantage that a bolt element (not shown) can be screwed into the functional element 410 from below. In this way, the annular fold and the rivet flange and the material of the sheet metal part 430 clamped therebetween are drawn even tighter together when the bolt is tightened, with the large contact surface 480 of the annular fold forming a very stable connection. In the event that the functional element 410 is to be used with such a bolt, the panel slug 450 is pressed into and removed from a central passage of the die, for example, by means of a leading piercing plunger. The removal of such a panel slug in this manner is already known. The leading piercing plunger is used to pre-pierce the sheet metal part in such cases. The die is then made in a known manner such that it only deforms the free end of the hollow head part around the correspondingly deformed sheet metal part. That is, the die is made provided with a central hole instead of with a plunger projection such as 34 in FIG. 2. The slug can, however, also be ejected in a subsequent operation, when the element is inserted as shown in FIG. 2.

Figure 13:
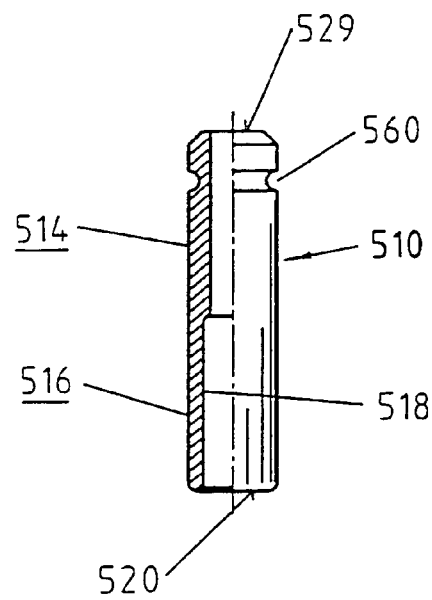

FIG. 13 shows a functional element 510 which is also made in tubular form, but which has no thread. The functional element instead has a peripheral groove 560 which is intended to receive a spring clip (not shown). It can also be seen that the free end 529 of the functional element 510 of FIG. 13 is made in a conical shape. The corresponding spring clip can be pressed downwards over this conical surface and then springs into the groove 560.

The functional element 510 of FIG. 13 can be inserted in this or in a slightly modified form (for example without the peripheral groove 560) into a sheet metal part and be used either as a pin or as a cylindrical spigot. It could also be used with a thread-forming screw which shapes or cuts a thread itself when screwed into the completed component assembly in the hollow shaft part 514 of the functional element 510. In the embodiments of FIGS. 10, 11, 12 and 13, the hollow head part 316, 416, 516 can easily have a larger or smaller diameter than the outer diameter of the corresponding shaft part 314, 414, 514.

In the embodiments with a hollow shaft part, the inner plunger 48 can optionally be guided into the hollow internal space of the shaft part to stabilise the functional element during the compression procedure. This procedure, which also has an advantageous effect on the formation of the annular fold, is shown in FIG. 14 in the drawings 14B, 14C and 14D. For this purpose, the inner plunger 648 has a journal-like projection 649 with a diameter corresponding to the inner diameter 651 of the hollow shaft part 614, with the projection 649 merging into the upper part of the inner plunger via an annular shoulder 653 which presses onto the annular end 629 of the shaft part.

The outer plunger 642 of the plunger arrangement 643 in accordance with FIGS. 14B to 14D can be provided with a circular cylindrical bore whose diameter corresponds to the diameter of the external thread 612 of the shaft part 614, approximately as shown in FIGS. 14C and 14D.

Despite the spigot-like projection 649 of the inner plunger 648, with such an arrangement it is, however, possible under certain circumstances that the thread cylinder is damaged and/or that the thread cylinder is compressed. The double arrows of FIG. 14B indicate a possible remedy. This remedy consists of the outer plunger 642 being divided into at least two segments which, corresponding to the double arrows 655, can be moved radially away from the element 610 into position 657 in which they do not impair the insertion of the element 610 through the plunger passage 646 of the setting head. These segments, of which there may be two, three or more and which then have a corresponding angular extent (for example 180°, 120°, etc.), can be provided on their radially inner sides with a shape 659 matching the thread cylinder 612 so that, during a closing movement of the segments of the outer plunger in a direction radially towards the longitudinal axis 624, the thread segments of the corresponding thread 659 engage the thread of the thread cylinder 612 and in this way serve to transmit axial forces to the element 610 on the one hand and, on the other hand, prevent any compression of or injury to the thread cylinder 612 from occurring. For this purpose, the design of the thread segments 659 is selected complementary to that of the thread cylinder 612.

After the attachment of the element in accordance with FIG. 14D, the segments of the outer plunger 642 are then moved apart again, that is in a direction radially outwardly away from the longitudinal axis 624, so that the outer plunger 642 can travel upwards for the removal of the completed component assembly in accordance with FIG. 14E without the thread cylinder being damaged thereby.

The concept of the radial movement of segments of the outer plunger 642 will be described in more detail below with reference to a preferred embodiment in accordance with FIG. 18.

Figure 15:
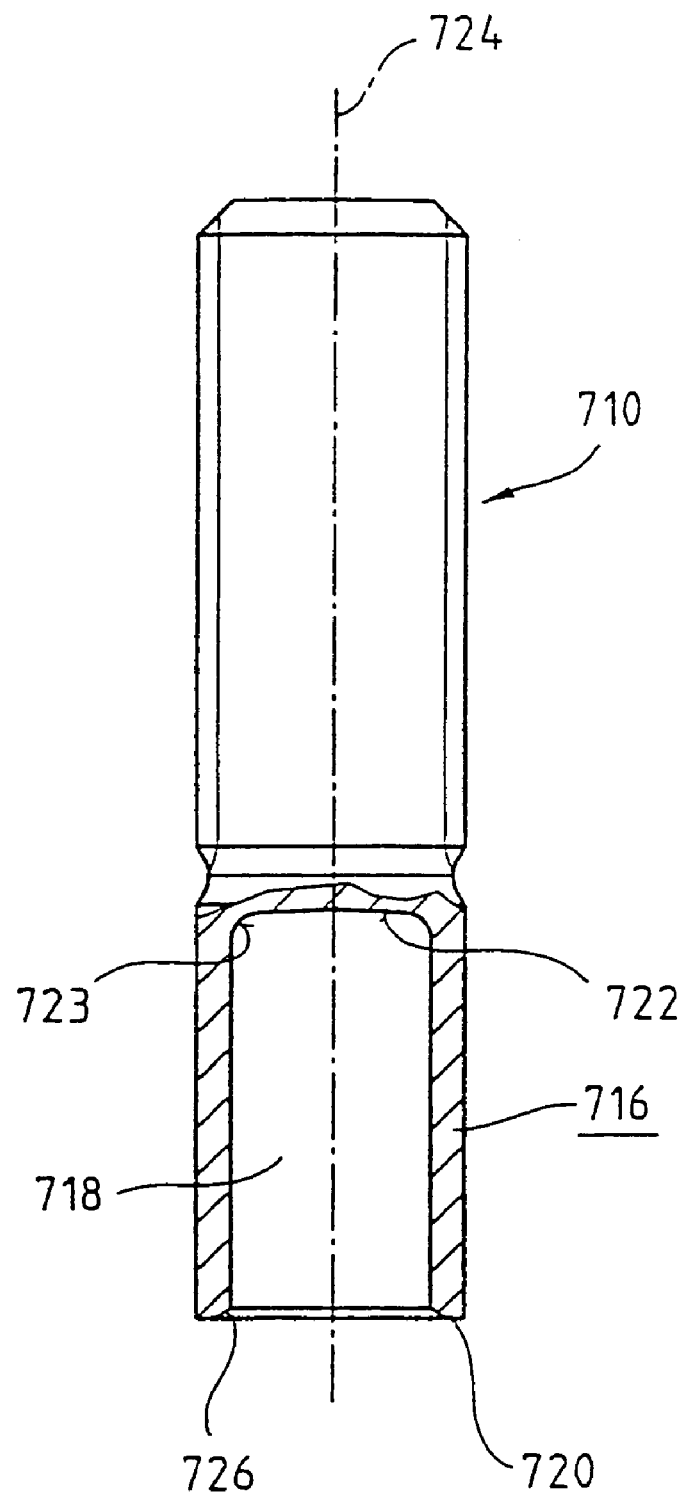
FIG. 15 shows a further embodiment of an element in accordance with the invention similar to that of FIG. 1, also in a representation partially cut away in the axial direction, with this element being used in the following description of the die and process technology preferred in accordance with the invention in accordance with FIGS. 16 to 18.

FIG. 15 now shows a functional element 710 which is very similar to the functional element 10 of FIG. 1 and which basically only differs from this in that the base of the hollow space 718, which forms the transverse wall 722, is made only slightly concave here instead of conical and extends substantially perpendicularly to the longitudinal axis 724 of the element 710 and merges into the cylindrical outer wall of the head part 716 of the element 710 via a generous radius 723. While this shape of the base forming the transverse wall 722 is not absolutely necessary, it does lead to a more high quality support of the shaft part in a practical example, which serves the stability of the connection.

FIGS. 16A and 16B show the die which is preferably used to insert the functional element 710 of FIG. 15. While this die 732 is similar to the die in accordance with FIG. 2, it does show certain differences. For instance, the plunger projection 734 in this embodiment is extended axially upwards in the direction of the longitudinal axis 724 so that the flat face 735 of the plunger projection 734 projects slightly above the end face 733 of the die.

This embodiment has the advantage that while the functional element is still made with a conical cutting surface 726, the face 720 of the head part 716 is made simply as an annular surface which is perpendicular to the longitudinal axis 724 and which is not rounded as, for example, at the rounded portion 28 in FIG. 1. A manufacturing step is saved in this way in the manufacturing of the functional element. The annular recess 740 of the die 732 is in principle of similar design to the annular recess 40 of the die 32 in accordance with FIG. 2, but is rounded convexly at the transition into the end face 733, as shown at 737. Furthermore, a plurality of inclined grooves 739—in this embodiment eight such grooves, as shown in FIGS. 16B—are worked into this rounded transition 737 so that radially extending noses 741 are in each case formed between two adjacent grooves 739.

The grooves 739 are at least substantially semi-circular in shape in cross-section and well rounded, like the noses 741 therebetween, so that while they do deform the sheet metal part, they do not injure it. These grooves 739 and noses 741 serve to increase the security against rotation of the element with respect to the sheet metal part.

FIGS. 17A to 17H now show the die 732 in accordance with FIG. 16, which is used to attach the functional element 710 to a sheet metal part 730 using a plunger arrangement 743.

The die 732 is here located in a bore 760 of a lower tool 762 of a press whose upper side 764 is arranged flush with the face 733 of the die. A plurality of tappets 768 upwardly biased by spring 766 are located in the lower tool 762 and support the sheet metal part 730 during the insertion into the press, but can be pressed downwardly due to the force exerted by the hold down member 770 when the press is closed so that the sheet metal part 730 comes into contact with the end face 733 of the die 732 and with the upper side 764 of the lower tool in the region of the die and is immovably clamped there between the hold down member 770 and the die 732 or the lower tool 762.

Three such spring-biased tappets 768, for example, can be provided which are arranged, for example, at equal angular intervals around the central longitudinal axis of the die 732, with only one tappet 768 being visible due to the sectional drawing. The central longitudinal axis of the die is simultaneously the central longitudinal axis 724 of the functional element 710, that is it is aligned therewith.

The hold down member 770 is also biased in the direction of the sheet metal part by springs 772 which here—like the spring 776—are indicated schematically as compression coil springs, although other spring types can also be used which are well known in tool-making. The hold down member 770 can belong to a setting head having the plunger arrangement 743 or to a tool of the press on which the setting head is fitted. The upper ends of the springs 772 are accordingly braced against the setting head or the tool.

In this example, three springs 772 are also arranged at equal angular intervals around the central longitudinal axis 724 so that the hold down member 770 is pressed evenly downwards under the force of these springs.

FIG. 17A shows the state after the sheet metal part 730 has been inserted into the press and the closing movement of the press has been begun just so far that the hold down member 770 now contacts the upper side of the sheet metal part and lightly clamps the sheet metal part between it and the tappet 768.

The plunger arrangement 743 here also comprises an outer plunger 742 and an inner plunger 748, with the lower end 774 of the inner plunger 748 pressing onto the upper face 729 of the functional element 710. It can be seen that the head part 716 of the functional element 710 projects at least substantially completely from the outer plunger 742, with the transverse wall 722 forming the base being arranged only slightly above the lower face 776 of the outer plunger 742. The shaft part 714 of the functional element 712 is, in contrast, located completely inside the outer plunger 742.

It can be assumed in this representation that the lower tool 762 represents the lower tool of a press while the setting head is fixed in the upper tool of the press or on an intermediate plate. Different arrangements are also feasible which were described at the end of the description of FIG. 5.

As the press continues to close, the spring-biased hold down member 770 is pressed so hard against the sheet metal part 730 that this presses the spring-biased tappets 768 downwards until the sheet metal part 730 is now clamped firmly and immovably between the hold down member 770 and the lower tool 762 or the face 733 of the die. In this example, a further downward movement of the hold down member 770 is not planned. The upper tool of the press or the intermediate plate of the press can, however, be moved further downwards in accordance with the further closing movement of the press, whereby the compression coil springs 772 are further compressed, without the hold down member 770 changing its position.

In this further closing movement of the press, the outer plunger 742 is also pressed so far down together with the inner plunger 748 in the stage of FIG. 17B that the lower end 720 of the functional element 710 has just cut a panel slug 750 out of the sheet metal part 730 in cooperation with the plunger projection 734 of the die 732.

It can be seen that the inner diameter of the shaft part 716, that is the diameter of the hollow space 18, is only slightly larger than the outer diameter of the plunger projection 734. It can further be seen that the lower end 720 of the functional element 710 has pressed the marginal region 778 of the aperture of the sheet metal part 730 created by the separation of the panel slug 750 into the annular depression 732 of the die under the pressure of the plunger 748 so that this marginal region 778 forms a conical recess in the sheet metal part 730.

In the further closing movement of the press in accordance with FIG. 17C, the marginal region 778 of the aperture created by the removal of the panel slug 750 is pressed even further into the annular depression 736, with the end 720 of the functional element 710 having just reached the U-shaped base region of the annular depression 736 and just being about to be deformed radially outwardly by the shape of this base region.

This deformation is then continued during the further closing of the press in accordance with FIG. 17D so that the end 720 is now rolled annularly outwards and engages round the lower end of the marginal region 778, whereby the rivet flange is now being created. During this further closing movement of the press, the panel slug 750 is always pushed further axially into the shaft part 716 of the functional element 710. As the press continues its closing movement, in the state of FIG. 17E, the cylindrical wall of the shaft part 716 now begins to be expanded radially outwards in the region inside and above the marginal region 778 of the sheet metal part 730 and beneath the transition to the shaft part 14, so that the wall of the head part in the region of the face 735 of the plunger projection 734 begins to move away therefrom in a radial direction. The panel slug 750 is displaced further in the direction towards the shaft part 14 of the functional element 710.

As the press continues the closing movement, the state in accordance with FIG. 17F is reached, where it can be seen that a clear kink 728 has arisen in the wall of the head part 716 of the functional element 710 directly adjacent to the plunger projection 756.

As the closing movement of the press continues further, the region of the wall of the head part 16 of the functional element 10 below the kink position 782 is now formed into an annular fold or to an annular bulge 752. The face 754 of the outer plunger 742 now presses onto the top of the sheet metal part 730. The plunger projection 756 has now pressed the top of the ring fold 752 flat so that its surface is arranged slightly beneath the plane of the top of the sheet metal part 730 and is additionally perpendicular to the longitudinal axis 724. The panel slug 750 has now directly reached the end of the hollow space 718 of the head part 16 of the functional element 10 and supports the ring fold 752 from the inside. The press is now completely closed in the state of the drawing in accordance with FIG. 17G. The insertion of the functional element 710 into the sheet metal part 730 is now complete.

The sheet metal material and the material of the head part 16 of the functional element 10 is now deformed in the region of the grooves 739 and noses 741 of the die 732 by the pinching of the annular fold by the plunger projection 756 so that the sheet metal material hooks up with the material of the functional element here, whereby a high-quality security against rotation is created.

The press now starts to open, as shown in FIG. 17H. The tappets 768 press the sheet metal part with the attached functional element away from the lower tool 762 and lift the sheet metal part with the attached functional element out of the die 732. The further opening movement of the press then leads to the shaft part 714 of the functional element 710 being removed from the plunger 742. The sheet metal part with the functional element attached thereto can now be removed from the press and appears as shown in the representation in accordance with FIG. 17I.

It can be seen that the inner plunger 748 and the outer plunger 742 move in synchronism with one another during the total closing movement of the press from the state of FIG. 17A to FIG. 17G and even also including FIG. 17H. This can be achieved, for example, by the inner plunger 748 having a head part of a larger diameter above the outer plunger 742, this head part coming into contact with the outer plunger 742 so that a relative movement of these two parts is prevented from this point on. The inner plunger 748 should, however, still be capable of upward movement relative to the outer plunger 742 to allow the insertion of the functional element 710 into the plunger passage of the inner plunger 742.

FIG. 18 shows a possible plunger arrangement 842 in detail which can be used advantageously instead of the plunger arrangement 743 in accordance with FIG. 17.

The outer plunger 842 is provided with an inner bore 886 which is arranged coaxially to the longitudinal axis 824' and displaceably receives the inner plunger 848. A supply passage 888 is shown on the right-hand size of the sectional drawing in accordance with FIG. 18A through which the functional elements 810 can be inserted from a feed device (not shown) into the plunger passage formed by the bore 886. Although the functional elements 810 shown in FIG. 18A approximately have the shape of the functional elements 10 in accordance with FIG. 1, where the base of the transverse wall has a conical design, basically all functional elements described up to now can be used, above all the functional elements 710 in accordance with FIG. 15 or FIG. 17. It can be seen that the longitudinal axes 824 of the individual functional elements are parallel to the longitudinal axis 824' of the plunger passage 886 and that the individual functional elements are arranged in rows touching one another. However, due to the dimensions of the plunger passage 886, only one functional element 810 at a time can be located in the plunger passage 886.

When the press is opened, the outer plunger 842 is displaced downwards with respect to the inner plunger 848, usually under the pressure of a corresponding spring until the end face 874 of the inner plunger 848, approximately reaches the level of the upper boundary of the supply passage 888 so that a functional element 810 can be inserted into the plunger passage 886 by pressure in the direction of the arrow 890.

The outer plunger 843 in this embodiment is made in a plurality of parts and comprises a lower annular part 892 fastened to an upper part 894 by screws (not shown). The lower part 892 has a central aperture 895 with an annular wall 896 of circular cylindrical shape which merges into a conical region 898. Both the circular cylindrical region 896 and the conical region 898 are arranged concentrically to the longitudinal axis 824'. The upper part 894 of the outer plunger 843 is provided with a conical recess 900 which merges into the plunger passage 886 via an annular shoulder 902. The conical region 900 and the annular shoulder 902 are also arranged concentrically to the longitudinal axis 824' of the plunger arrangement.

In this embodiment, three segments 904, which are arranged at equal angular intervals around the central longitudinal axis 824', are located in the region between the upper part 894 and the lower part 892 of the plunger arrangement 842. The three segments 904, of which only two can be seen in FIG. 6, together form a receiver 905 arranged coaxially to the longitudinal axis 824' for a respective functional element 810. The lower surfaces 908 of the segments 904 pointing radially inwards are made as a segment of a thread cylinder which is designed to be complementary to the thread cylinder 812 of the shaft part 814 of the functional elements 810. The upper surfaces 912 of the segments 904 pointing radially inwards together form a passage 913 having a diameter which is somewhat smaller than the outer diameter of the head part 816 of the respective functional elements 810. The radially outer surfaces 914 of the segments 904 are designed as partially conical surfaces which are complementary to the conical surface 900 of the corresponding recess of the upper part 894 of the outer plunger 842. The radially upper surfaces 916 of the segments 904 are designed complementary to the annular shoulder 902 so that in the position of FIG. 18A, the partially conical surfaces 914 of the segments 904 and the partially circular surfaces 916 fully contact the respective opposing surfaces of the outer plunger 843, i.e. the surface of the conical recess 900 and the annular shoulder 902.

In this position, the through passage 913 formed by the segments 904 is made such that it is smaller in diameter than the outer diameter of the head part 16 of the functional element 810. In this way, the respective functional element 810 can initially not fall between the segments, but is rather supported at the upper end of the segments 904 as is shown in FIG. 18A.

The upper region of the respective segments 904 merges into a partially cylindrical wall part 922 via a partially conical surface 920. The partially conical surfaces 920 of the segments 904 are opposite the conical surface 898 of the lower part 892 of the plunger arrangement 842 in the position in accordance with FIG. 18A and are spaced therefrom. The partially cylindrical surfaces 922 of the segments 904 are opposite the partially cylindrical surface 896 of the lower part of the plunger arrangement 843 and are radially spaced therefrom in each case.

To ensure that the segments 904 always return to the starting position of FIG. 18A, tappets 928 biased by springs 926 are provided whose axes 930 are inclined with respect to the longitudinal axis 824' of the plunger arrangement 843 and perpendicular to the conical surface 898 of the lower part 892 of the plunger arrangement 843. The spring bias causes the tappets 928 to be pressed against the partially conical surfaces 922 of the segments 904 contacting them directly such that when the press is open, these always assume the position shown in FIG. 18A. The spring bias is not very strong.

If the press is now closed, the inner plunger 848 is pressed downwards with respect to the outer plunger and in this process presses the respective functional element 810 located in the plunger passage 886 against the upper face of the segments 904. As a result of the sloped entrance to the passage 913 and the correspondingly inclined outer surface in the region of the lower face 820 of the respective functional element 810, the force exerted on the inner plunger 848 is sufficient to press the segments radially downwards in the axial direction 824' and radially outwards so that they press the pins 928 downwards until the partially conical surfaces 920 come into contact with the conical surface 898 of the lower part 892 of the outer plunger 843.

The radially outwardly directed movement of the segments 904 causes the inner diameter of the passage 913 bounded by these segments to increase so that the respective functional element located in the plunger passage 886 is pressed into the passage between the segments 904 under the force of the inner plunger 848. An intermediate stage of this movement is shown in FIG. 18B, and this movement subsequently continues until the upper shaft part 814 of the respective functional element 810 provided with a male thread 812 is located in the lower region of the segments 904, where these then move radially inwardly and upwardly under the force of the springs 926 biasing the pins 928 until the thread segments in the radially inwardly directed lower surfaces of the segments 904 engage in a form-locked manner with the thread cylinder 812 of the functional element 810. This situation is shown in FIG. 18C and it can be seen that the front section of the inner plunger 848, which has a smaller outer diameter than the upper part of the inner plunger 848, is arranged in a form-locked manner inside the passage 913 formed by the segments 904, which is of benefit for the centering. The functional element 810 in FIG. 18C has now reached a position which is comparable to that of FIG. 15A, and the piercing process to insert the element can now begin and runs in accordance with FIG. 17.

Although not shown in FIG. 18, the arrangement is made such that the inner plunger 848 cannot move any further downwards than as shown in FIG. 18C. This can, for example, be prevented by the upper part of the inner plunger 848 being provided with a head which has come into contact with the outer part 842 of the plunger in its "lowest" position in accordance with FIG. 18C. The whole force of the press is now transferred via the inner plunger 848 to the face 829 of the functional element 810 and via the outer plunger 842 and the segments 904 to the thread 812 of the functional element. It is ensured in this way that the thread cannot be damaged as it is received in a form-locked manner inside the complementary thread parts of segments 904 so that the thread cylinder cannot be compressed. If the shaft part 814 of the functional element is intended to be made hollow, the cylindrical projection 930 of the inner plunger 848 can be designed accordingly and can extend via an annular shoulder (not shown) pressing onto the end 829 of the functional element 810 into the inner bore of the shaft part so that the pressing forces can be transmitted to the functional element 810 without any damage to this element by the pressing together of the walls of the hollow shaft part needing to be feared, as this element is supported by the extended projection of the inner plunger.

It should be pointed out at this point that the number of segments 904 is not limited to three. The minimum number required to realise this embodiment is two; however, three, four or more such members can also be used, with preferably one respective pin 928 with bias spring 926 being provided for each member.

The lower ends of the segments 904 can, if required, be provided with noses 956 which jointly form the plunger projection 756 of FIG. 17.

After the attachment of the functional element 810 in accordance with the drawing sequence of FIG. 17, the press opens again, whereupon the sprung hold down member exerts a force on the sheet metal part with the attached functional element, with said force being sufficient to draw the segments 904 downwards into the position of FIG. 18B in order to release the shaft part 814. As the spring tension of the spring 928 is small, the release of the functional element when the press is opened is carried out without damaging the respective functional element 810 just attached.

After the release of the functional element 810 just attached, the opening of the press results in the outer plunger 842, which is biased downwards by the spring force, being pressed downwards, while the inner plunger 848 is drawn upwards until it reaches the starting position where the lower end face of the inner plunger 848 has reached the level of the upper boundary of the passage 888, whereby a new element is introduced into the plunger passage 886 by the pressure in the direction of the arrow 890. The working cycle then begins afresh with a new sheet metal part and with a new functional element 810, namely the functional element that is now located in the plunger passage 886.

The tool arrangement can be a station in progressive tooling where a strip of sheet metal is led through a plurality of stations to carry out a plurality of operations. The tool arrangement can, however, also be used in a piercing press which only performs a single working step for every stroke. The attachment of the tool arrangement to a robot or another kind of tool is also possible.

The functional elements in accordance with the present invention are not only intended for use with purely metal sheet parts, but can also be used with a number of further components which can be understood as composite components.

Such components are frequently brittle or elastic components which consist of a material containing hollow spaces or pores and frequently of a material. The following materials can be given as examples of materials used for the manufacture of components, in particular of brittle or compliant components, which can be fitted with functional elements in accordance with the invention:

Metal Foams

These are highly porous metal materials whose pore size and distribution can be set to a defined value in the manufacturing process and which are interesting for a wide range of possible applications. Such metal foams also offer savings in material and weight, and thus also cost savings, for a variety of components. They can absorb impact energy through progressive deformation and can therefore, for example, be used for energy-absorbing parts such as structural parts of vehicles which are intended to absorb impact energy to protect the occupants in cases of accident. Furthermore, they have excellent damping properties so that they can easily absorb or attenuate sound waves and mechanical vibrations.

Metal foams made, amongst other things, of aluminium or magnesium and metal foams made of steel are known. Different manufacturing processes are known which can be used for the production of such metal foams. For example, metal powder can be mixed with a chemical compound which later—in a thermal treatment—effects the foaming of the metal. Gas, which causes the foaming, is released at the metal's melting point. It has already been possible in this way to produce foamed aluminium with a gas portion of up to 97%. Steel foams can also be produced using this method. The process can be used for a wide range of elements and alloys. The possibility also exists of making metal structures from hollow balls, for example hollow steel balls.

For the production of magnesium foams with a gas portion of up to 60% it is known to embed thin-walled hollow ceramic balls in a magnesium matrix in a casting process, with magnesium alloys also being used and being freely selectable.

Such materials can be harder and more brittle or, however, softer and more ductile than the starting alloy, depending on the matrix alloy.

After their manufacture, the foams frequently exhibit a cast skin which is either removed or smoothed using a filler material. Foams with a cast skin, which is optionally filled with a filler material, form a kind of sandwich structure.

Sandwich Structures with Metal Foams

The metal foams described above can be produced with or without a cast skin and with upper and/or lower covering layers made of sheet metal or plastic to produce material composites in the form of a sandwich structure with a core made of a metal foam.

Properties such as scratch resistance, low or high friction, corrosion resistance and good wear properties can be achieved by the application of coatings or coating layers to the core. The corresponding components or any covering layers present can be coated using all known coating methods, i.e. using electroplated coatings, lacquer coatings or coatings applied, amongst other things, by means of PVD methods. When sheet metal layers are provided on a core consisting of foam, the sheet metal layers can be glued or bonded to the metal foam core, with soldering or brazing methods also being possible. Glues are normally used to achieve the bond to the core for covering layers made of plastic.

Another method to produce sandwich structures is to provide hollow sections made of metal or plastic, for example, in the form of sections extruded in an extrusion process, either completely or regionally with a metal foam core. This can be done by the insertion of elongate strips of foam metal, optionally with a surface bonding of the foam metal to the section, or by the foaming of metal/foam mixtures in the hollow section. Open sections or shaped sheet metal parts can also be provided with an insert made of foam metal (insert made of one layer of foam metal or of a plurality of layers of foam metal) and then covered with a covering strip or section which is fastened to the open section in the marginal region by welding, riveting, bonding or otherwise. Plastic foams or other materials in such composite structures can also be used instead of foam metal. A concrete use of such sections filled with foam metal or a plurality of fillers is the use as a B column of a motor vehicle which can be made by the filling of a pre-fabricated section, optionally with a subsequent shaping by bending or pressing.

The desired mechanical properties can be set by the section-wise filling of such sections. For example, the desired rigidity or buckling strength can be achieved in one region and the desired deformation, for example, in the event of an accident, in another.

Other Sandwich Structures

Material composites consisting of a core with a honeycomb structure and of upper and/or lower covering layers can also be used, whereby the covering layers can be made of sheet metal or plastic plates. The honeycomb structure can be made of metal, metal foils or of cardboard or paper or of plastic or of cellulose or lingo-cellulose.

Materials with Brittle Fracture Characteristics

Such materials include castings made, for example, of magnesium, magnesium alloys and thermosetting plastics, with and without fillers. Such materials can also be used for components which are fitted with functional element arrangements in accordance with the invention.

Further Component Materials and Designs

Plastic components, components made of woods or pressed boards or the like can also be used for the component assemblies in accordance with the invention, with such materials usually having to be considered as compliant as they normally yield a lot under the forces which prevail in the making of a rivet joint.

Special material composites are also feasible which consist of a combination of one or more of the above materials, for example of multi-layer arrangements comprising a plurality of layers bonded to one another, whereby, for example, thicker components or components with more complex shapes can be built up.

FIGS. 19 and 20 show two possibilities of how a functional element 1010 in accordance with the invention can be used with a composite component 1030.

FIG. 19 shows the functional element 1010 in the starting state in a half-section on the left-hand side of the central longitudinal axis 1024, with the other half of the functional element 1010 being made symmetrically on the other side of the central longitudinal axis 1024—with the exception of the thread, which naturally forms a continuous thread cylinder with the shown half of the thread.

In deviation from the prior embodiments, a flange 1011 is provided here between the shaft part 1014 and the head part 1016 and, as shown here, preferably bears noses 1013 which serve as additional security against rotation. The flange part 1011 with the features 1013 providing security against rotation can, if desired, be omitted; but it does provide a more stable attachment of the functional element 1010 to the composite component 1030 here. The composite component 1030 can have one of the embodiments given above for composite components.

Prior to the attachment of the functional element, the composite component is prepared as is shown on the left-hand side of the central longitudinal axis 1024.

It can be seen that a cylindrical bore 1031 was made with a circular cylindrical wall in the component 1030 and that the upper layer 1033 of the composite component 1030 was formed into a swaged recess 1035. The bore 1031 can be made by a drilling process or a piercing process, while the swage 1035 is normally made by a piercing step, for example in a piercing press. If both the bore 1031 and the swage 1035 are made by piercing, this can be done in one step by means of a correspondingly shaped piercing tool. The swage 1035 has a shape similar to that of the flange part 1011.

When the functional element is attached, which can be done using a die in accordance with FIG. 2, a form-locked joint is created between the hollow head part 1015 of the functional element 1010 and the lower layer 1039 of the composite component 1030. This joint is very similar in shape to that of FIG. 5, in that the hollow head part 1016 is formed to a rivet flange 1037 in its end region and this rivet flange 1037 comes to rest below the lower layer 1039 of the composite component 1030 and in that the region of the hollow head part 1016 above this lower layer 1039 is formed to an annular fold 1052. The annular fold 1052 forms a U-shaped annular groove together with the rivet flange 1037 in which the marginal region of the lower layer 1039 previously also defining the bore 1031 was received. It can, however, also be seen that the annular fold 1052 is not quite as strong as the annular flange 52 in the FIG. 5 embodiment, which is understandable as it is not possible to subject this region to the stress of an outer plunger in this embodiment. Furthermore, this embodiment lacks a panel slug, as the composite component 1030 was pre-drilled here. In other words, the lower end of the functional element 1010 in FIG. 19 is not thrust through the lower layer 1039 in a self-piercing manner. As no panel slug is formed here, it is not necessary to make the rounded annular depression or roll surface of the die as deep as shown at 36 in FIG. 2.

As the composite component 1030 is supported on a die from below, and as the functional element 1010 is pressed downwards by a plunger from above, the noses and features 1013 provided for security against rotation are pressed into the upper side of the upper layer of the composite component 1030 in the region of the swage 1035. After the attachment of the functional element, the upper side 1041 of the flange part 1011 is approximately flush with the upper side (in FIG. 19) of the upper layer 1033 of the composite component 1030. The core material of the composite component 1030 is deformed in accordance with the extension of the annular fold 1052 and the lower layer 1039 in the region of the annular fold 1052 and the U-shaped annular groove 1053.

If no flange part 1011 is provided, a swage 1035 is unnecessary and the prepared component 1030 then has only a cylindrical bore, with the circular aperture in the upper layer preferably having at least substantially the same diameter as the outer diameter of the hollow head part 1016.

FIG. 20 shows a slightly modified embodiment in comparison with FIG. 19. The component 1030 is here also prepared by the making of a cylindrical bore 1031, this bore 1031 however stops immediately above the lower layer 1039 of the composite material 1030. No swage 1035 is made in the upper layer 1033 of the composite component 1030 here, either. The diameter of the bore 1031 corresponds—as also in the embodiment in accordance with FIG. 19, at least substantially to the outer diameter of the hollow head part 1016 of the functional element 1010, which is here identical to the corresponding element 1010 of FIG. 19.

In this embodiment, the lower end of the functional element 1010 is equipped with piercing features which cause the stamping out of a panel slug 1050 in cooperation with a corresponding die (approximately corresponding to the die of FIG. 2), with this panel slug being pressed into the hollow head part 1016 in the region of the transverse wall 1022 of the hollow head part 1016 as a result of a central post of the die arranged at a higher position.

The form-locked joint in the region of the rivet flange 1037 is then basically formed identically to the embodiment in accordance with FIG. 19; except that here, the annular fold 1052 is additionally supported on the inner side by the panel slug 1050.

As no swage 1035 is provided in the upper layer 1033 of the composite component 1030, the lower side of the flange part 1011 of the functional element contacts the upper side of the upper layer 1033. This is only pressed in slightly, above all in the region of the nose features 1013 providing security against rotation, to produce just the required security against rotation. The composite component 1030 in both examples is under a certain compression between the flange part 1011 and the rivet flange 1037, which is of advantage for the quality and the stability of the joint.

The functional elements described here can, for example, be made of all materials which reach the strength class 5.6. Such metal materials are usually carbon steels with a carbon content of 0.15 to 0.55%.

In all embodiments, all materials can also be named as examples for the material of the functional elements which reach strength values of Class 8 of the ISO standard as part of cold forming, for example a 35B2 alloy in accordance with DIN 1654. The fastening elements formed in this way are suitable, among other things, for all commercial steel materials for sheet metal parts capable of being drawn as well as for aluminium or their alloys. Aluminium alloys, in particular such with a high strength, can also be used for the functional elements, e.g. $AlMg_5$.

The trials carried out up to now have shown that when the material 35B2 is used, the ratio of the radial wall thickness of the head part to the outer diameter of the head part is in the region of between 0.15 and 0.2. Higher values are to be desired as they increase the yield forces and the pull-out forces. However, it must be ensured that the pressing in forces do not lead to an impermissible deformation. With a diameter of 8 mm, a radial thickness of 1.2 mm has proved to be favourable.

The invention claimed is:

1. A functional male element of metal adapted for use with a metal panel element of steel of drawing quality and having a thickness, and comprising:
    a shaft part:
    a head part axially aligned with said shaft part and forming a hollow tubular wall adapted for forming a riveting joint with a panel element;
    said male element being formed of a material which in the context of cold deformation achieves the strength values of class 5.6 in accordance with the ISO standard 898/1, dated August 1999;
    wherein said shaft part defines a shaft diameter and said tubular wall defines an outer wall diameter corresponding to said shaft diameter, said head part merging into said shaft part without a panel-element-contacting flange;
    wherein said head part includes a distal end defining an outer edge being rounded for punching and drawing and an inner edge defining a conical cutting surface remote from said shaft part and diverging in a direction going from said shaft part to a free end of said head part; said head part having a longitudinal dimension and tubular wall thickness, wherein, in use and under the action of pressing forces applied to said shaft part, said distal end of said head part operating in conjunction with a die button supporting said metal panel element pierces a slug from said metal panel element and wherein said tubular wall thickness and said longitudinal dimension are selected so that said longitudinal dimension forms an annular fold defining a panel-element-contacting flange and having a radially-outwardly-directed portion and a radially-inwardly-directed portion contacting said metal panel element, said longitudinal dimension being of sufficient length to also include a length of the head part in the metal panel element and a length of a rivet flange formed on an opposite side of said metal panel element from said panel-element-contacting flange.

2. A functional element in accordance with claim 1, wherein said distal end defines an outer edge rounded for punching and drawing and an inner edge defining a conical cutting surface.

3. A functional element in accordance with claim 1, wherein said head part defines an inner surface of said tubular wall having a substantially tubular shape.

4. A functional element in accordance with claim 1, wherein said head part includes a longitudinal dimension for forming an annular fold for securing the functional element to a sheet metal part having a thickness, said annular fold having a radial dimension and said longitudinal dimension amounting at least to a length of a rivet flange formed on a side of the sheet metal part remote from the shaft part plus the thickness of the sheet metal part plus double the radial dimension of said annular fold.

5. A functional element in accordance with claim 1, wherein said shaft part is hollow.

6. A functional element is accordance with claim 1, wherein said shaft part defines a threaded outer surface.

7. A functional element in accordance with claim 1, wherein said functional element is made as a cold formed part.

8. A functional element in accordance with claim 7, wherein said thread is formed from one of a thread rolling process and a compression forming process.

* * * * *